US009801107B2

(12) United States Patent
Krishnaswamy

(10) Patent No.: US 9,801,107 B2
(45) Date of Patent: Oct. 24, 2017

(54) APPARATUS AND METHODS OF WHITESPACE COMMUNICATION

(71) Applicant: QUALCOMM Incorporated, San Diego, CA (US)

(72) Inventor: Dilip Krishnaswamy, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 208 days.

(21) Appl. No.: 14/699,772

(22) Filed: Apr. 29, 2015

(65) Prior Publication Data

US 2015/0237550 A1 Aug. 20, 2015

Related U.S. Application Data

(62) Division of application No. 12/628,647, filed on Dec. 1, 2009, now Pat. No. 9,025,536.
(Continued)

(51) Int. Cl.
*H04W 36/08* (2009.01)
*H04W 72/04* (2009.01)
(Continued)

(52) U.S. Cl.
CPC ....... *H04W 36/08* (2013.01); *H04W 72/0453* (2013.01); *H04W 36/24* (2013.01); *H04W 72/082* (2013.01)

(58) Field of Classification Search
None
See application file for complete search history.

(56) References Cited

U.S. PATENT DOCUMENTS 6,801,519 B1 10/2004 Mangal
7,342,895 B2 3/2008 Serpa et al.
(Continued)

FOREIGN PATENT DOCUMENTS

CN 2653825 Y 11/2004
EP 1741238 A1 1/2007
(Continued)

OTHER PUBLICATIONS

Bahl, "Revisiting Wireless Networking in the Cognitive Networks Area", Source: http://nimios.eng.mcmaster.ca/papers/cds2008, (53 Pages).
(Continued)

*Primary Examiner* — Christine Duong
(74) *Attorney, Agent, or Firm* — Nerrie M. Zohn

(57) ABSTRACT

The described apparatus and methods provide communication services utilizing a combination of non-white space (NWS) and white space (WS) networks. For example, in an aspect, the described apparatus and methods receive, at a first base station (BS) and on a licensed frequency, a communication request for network access from a wireless access terminal (AT). The aspects also determine at least one available unlicensed frequency corresponding to a location of the wireless AT. Further, the aspects partition at least a portion of the network access for the wireless AT to be via the at least one available unlicensed frequency. Additionally, the aspects inform the wireless AT of the at least one available unlicensed frequency for use to obtain at least the portion of the network access. Additional aspects relate to NWS BS assisted handoffs of WS calls, dynamic caching of WS information, peer-to-peer WS communication, and WS BS venue-specific broadcasting.

13 Claims, 28 Drawing Sheets

Related U.S. Application Data

(60) Provisional application No. 61/163,706, filed on Mar. 26, 2009.

(51) Int. Cl.
  *H04W 36/24* (2009.01)
  *H04W 72/08* (2009.01)

(56) References Cited

U.S. PATENT DOCUMENTS

| | | | |
|---|---|---|---|
| 7,768,967 | B1 | 8/2010 | Mangal |
| 2002/0177444 | A1 | 11/2002 | Nagato et al. |
| 2003/0119480 | A1 | 6/2003 | Mohammed |
| 2004/0203815 | A1 | 10/2004 | Shoemake et al. |
| 2004/0203873 | A1 | 10/2004 | Gray |
| 2004/0240525 | A1 | 12/2004 | Karabinis et al. |
| 2006/0063533 | A1 | 3/2006 | Matoba et al. |
| 2006/0067354 | A1 | 3/2006 | Waltho et al. |
| 2006/0281404 | A1 | 12/2006 | Lee et al. |
| 2007/0026868 | A1 | 2/2007 | Schulz et al. |
| 2007/0032239 | A1 | 2/2007 | Shaheen et al. |
| 2007/0133482 | A1 | 6/2007 | Grannan |
| 2007/0213046 | A1 | 9/2007 | Li et al. |
| 2007/0253394 | A1 | 11/2007 | Horiguchi et al. |
| 2008/0130519 | A1 | 6/2008 | Bahl et al. |
| 2008/0165709 | A1 | 7/2008 | Soliman |
| 2009/0016456 | A1 | 1/2009 | Li et al. |
| 2009/0049159 | A1 | 2/2009 | Boscovic et al. |
| 2009/0109921 | A1* | 4/2009 | Bowen .............. H04W 36/24 370/331 |
| 2009/0196180 | A1 | 8/2009 | Bahl et al. |
| 2009/0275332 | A1* | 11/2009 | Niska .............. H04W 36/0077 455/436 |
| 2009/0296640 | A1 | 12/2009 | Gilbert |
| 2010/0014482 | A1 | 1/2010 | Matsumoto et al. |
| 2010/0034097 | A1 | 2/2010 | Nitta et al. |
| 2010/0035553 | A1 | 2/2010 | Shinada et al. |
| 2010/0246506 | A1 | 9/2010 | Krishnaswamy |

FOREIGN PATENT DOCUMENTS

| | | | |
|---|---|---|---|
| EP | 1935126 | A1 | 6/2008 |
| JP | H09511107 | A | 11/1997 |
| JP | 2004128636 | A | 4/2004 |
| JP | 2005184824 | A | 7/2005 |
| JP | 2006503500 | A | 1/2006 |
| JP | 2006094003 | A | 4/2006 |
| JP | 2006245906 | A | 9/2006 |
| JP | 2006304083 | A | 11/2006 |
| JP | 2007166488 | A | 6/2007 |
| JP | 2007184850 | A | 7/2007 |
| JP | 2007221784 | A | 8/2007 |
| JP | 2007235494 | A | 9/2007 |
| JP | 2007251249 | A | 9/2007 |
| JP | 2007300419 | A | 11/2007 |
| JP | 2007534222 | A | 11/2007 |
| JP | 2008048304 | A | 2/2008 |
| JP | 2008510343 | A | 4/2008 |
| JP | 2008518541 | A | 5/2008 |
| JP | 2009535867 | A | 10/2009 |
| KR | 20070010401 | A | 1/2007 |
| KR | 20080019592 | A | 3/2008 |
| KR | 20080104720 | A | 12/2008 |
| KR | 1020090005676 | | 1/2009 |
| WO | 9520865 | A1 | 8/1995 |
| WO | 2004036770 | A2 | 4/2004 |
| WO | 2005050965 | A1 | 6/2005 |
| WO | WO-2006016330 | A1 | 2/2006 |
| WO | 2006048721 | A2 | 5/2006 |
| WO | 07082244 | | 7/2007 |
| WO | 2007124577 | A1 | 11/2007 |
| WO | 2007129479 | A1 | 11/2007 |
| WO | 2008020536 | A1 | 2/2008 |
| WO | WO-2008034023 | A1 | 3/2008 |
| WO | 2008129660 | A1 | 10/2008 |
| WO | 2008129716 | A1 | 10/2008 |
| WO | WO-2009009309 | A1 | 1/2009 |

OTHER PUBLICATIONS

European Search Report—EP10756650—Search Authority—The Hague—Mar. 11, 2015.

"FCC-08-260A1; FCC-08-260A1", IEEE Draft, FCC-08-260A1, IEEE-SA, Piscataway, NJ USA, vol. scc41, Jan. 14, 2009 (Jan. 14, 2009), pp. 1-130, XP017634765.

Gurney et al., "Geo-location database techniques for incumbent protection in the TV white space," Proceedings from DySPAN 2008: 3rd IEEE Symposium on New Frontiers in Dynamic Spectrum Access Networks, Oct. 2008.

International Search Report and Written Opinion—PCT/US2010/028037, International Search Authority—European Patent Office—Oct. 15, 2010.

Lynch M., et al.,"IEEE 802 Petition for Reconsideration", IEEE 802.18 Comments to FCC TV White Space ENPRM4, Mar. 12, 2009, pp. 1-9, URL, https://mentor.ieee.org/802.18/dcn/09/18-09-0039-04-0000-petition-for-reconsideration-fcc-wsd-r-and-o-doc. doc.

Yuan Yuan, et al., "Knows: Cognitive Radio Networks Over White Spaces", New Frontiers in Dynamic Spectrum Access Networks, Dyspan 2007, 2nd IEEE International Symposium on, IEEE, PI, Apr. 1, 2007 (Apr. 1, 2007), pp. 416-427, XP031095648, DOI:10. 1109/Dyspan.2007.61 ISBN: 978-1-4244-0663-0.

* cited by examiner

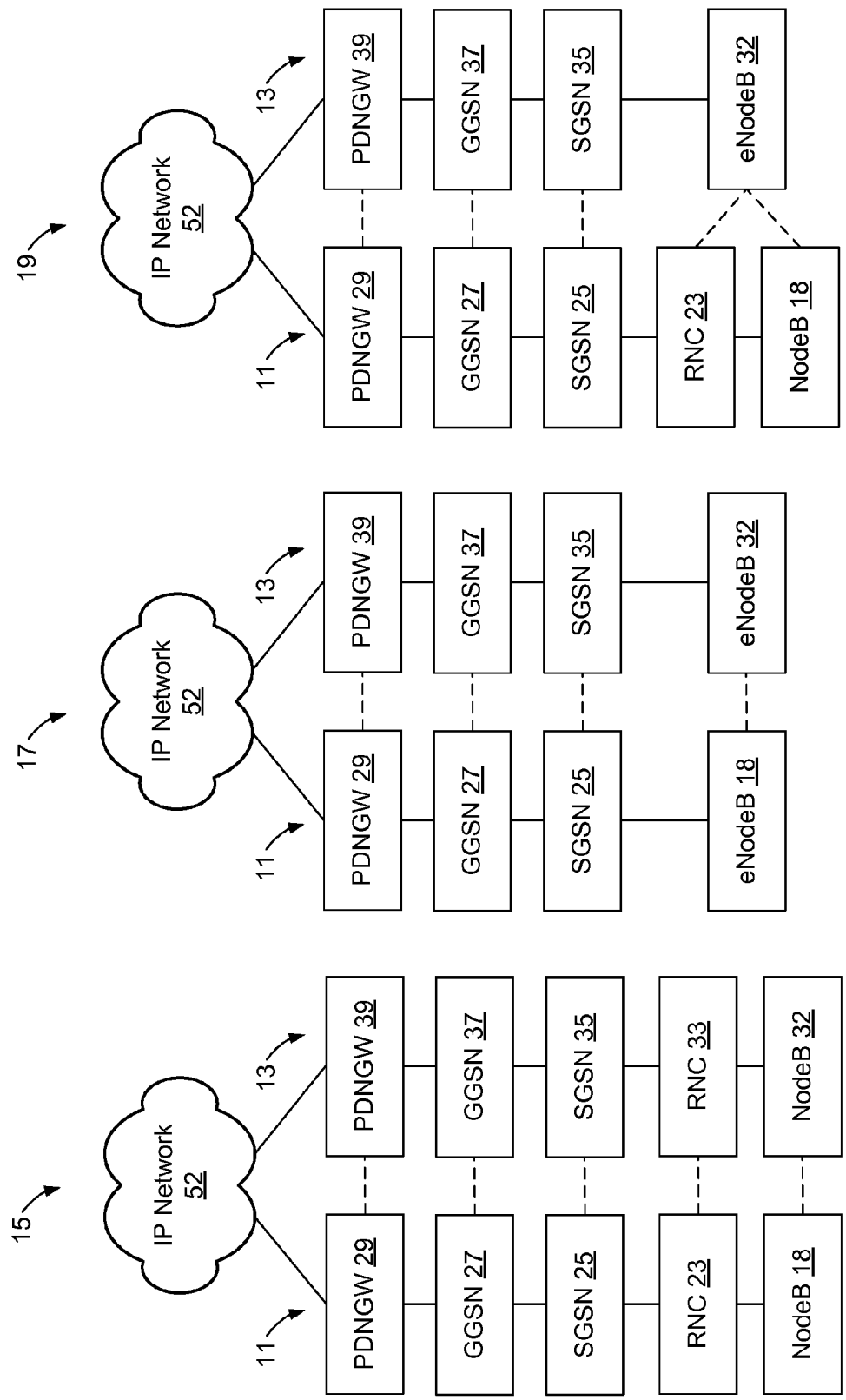

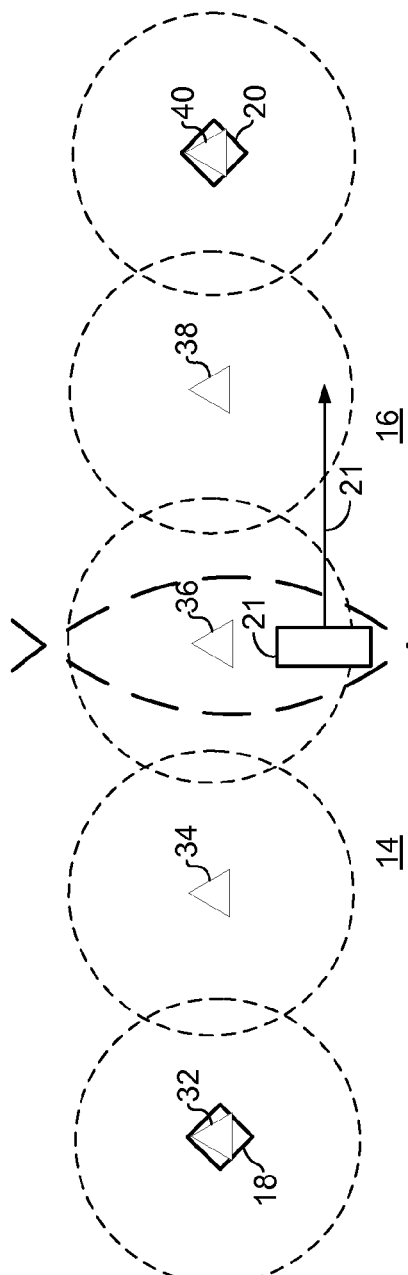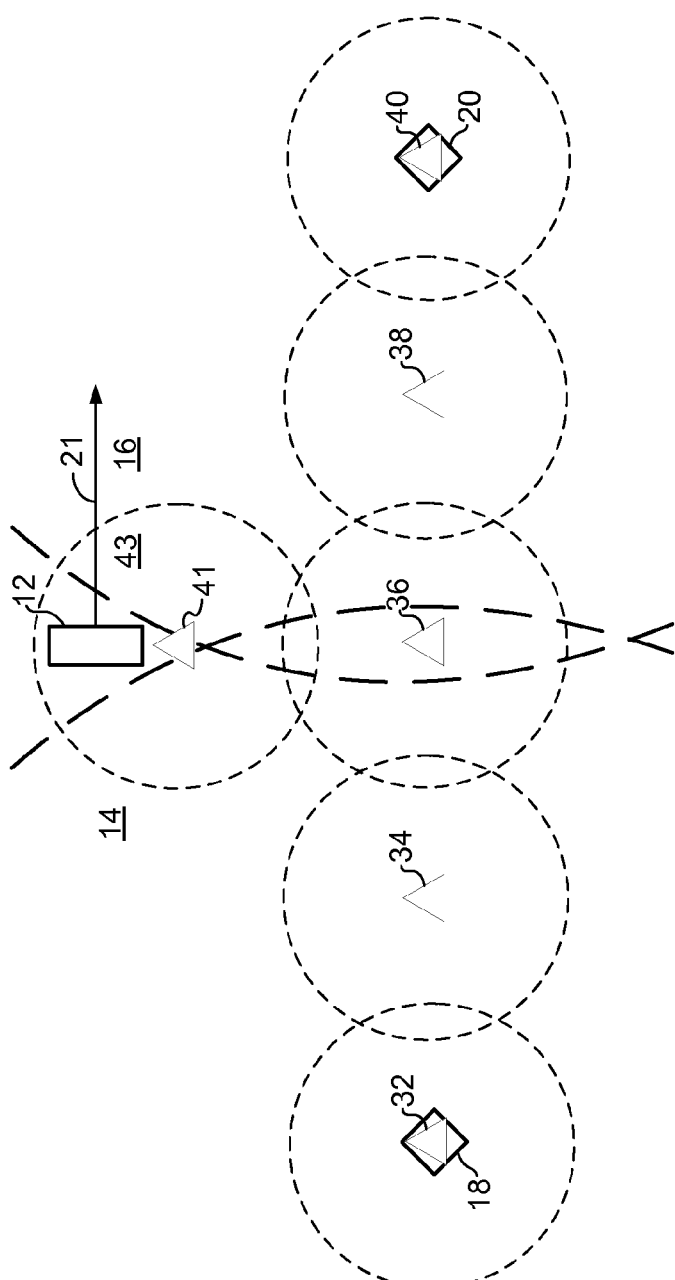

APPARATUS AND METHODS OF WHITESPACE COMMUNICATION

CLAIM OF PRIORITY UNDER 35 U.S.C. §119

The present application for patent is a divisional application of Ser. No. 12/628,647, filed Dec. 1, 2009, entitled "APPARATUS AND METHODS OF WHITESPACE COMMUNICATION," and claims priority to Provisional Application No. 61/163,706 entitled "APPARATUS AND METHODS OF WHITESPACE COMMUNICATION," filed Mar. 26, 2009, and assigned to the assignee hereof and hereby expressly incorporated by reference herein.

BACKGROUND

Field

The described aspects relate to communications, and more particularly, to communications in unlicensed spectrum.

Background

Wireless network operators and carriers are limited in the wireless capacity that they have available to support subscribers in licensed spectra. Recently, the US government has adopted rules that will allow unlicensed devices to operate in the unused television spectrum, commonly referred to as "whitespace," for communications. Thus, new communication apparatus and methods will be needed to enable mobile broadband services in the newly available unlicensed whitespace spectrum.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of providing communication services comprises receiving, at a first base station and on a licensed frequency, a communication request for network access from a wireless access terminal. The method further includes determining at least one available unlicensed frequency corresponding to a location of the wireless access terminal. Also, the method includes partitioning at least a portion of the network access for the wireless access terminal to be via the at least one available unlicensed frequency. Additionally, the method includes informing the wireless access terminal of the at least one available unlicensed frequency for use to obtain at least the portion of the network access.

Other aspects include at least one processor comprising modules configured to perform the above-noted method acts, or a computer program product comprising a computer-readable medium comprising instructions to perform the above-noted method acts, or an apparatus comprising means for performing the above-noted method acts, or a base station comprising a processor configured to perform the above-noted method acts.

In another aspect, a method of performing a handoff of a communication call comprises receiving notification, at a first base station operating on a licensed frequency, of a need to perform a handoff of a communication call of a wireless access terminal, wherein the communication call is on a first unlicensed frequency and is serviced by a second base station. Further, the method includes obtaining a location of the wireless access terminal, and identifying any base station operating in an unlicensed frequency spectrum and having a service area corresponding to the location of the wireless access terminal. Additionally, the method includes providing to the wireless access terminal identification information for a target base station for use in handing off the communication call based on the identifying.

In a further aspect, a method of obtaining whitespace information comprises caching a first version of the whitespace information at a first network infrastructure device located at a first infrastructure hierarchical level. Also, the method includes receiving an invalidation message corresponding to the first version of the whitespace information. Further, the method includes invalidating the first version of the cached whitespace information based on the invalidation message. Moreover, the method includes obtaining an updated, second version of the whitespace information at the network infrastructure device, wherein the obtaining is based on an infrastructure update protocol. Additionally, the method includes informing a second infrastructure device located at a second infrastructure hierarchical level, according to the infrastructure update protocol, of the updated, second version of the whitespace information.

In another aspect, a method of peer-to-peer (P2P) communication comprises receiving, at a first base station operating on a licensed frequency, a communication request for a communication session in an unlicensed frequency spectrum, wherein the communication request corresponds to a first wireless communication device having first location information and wherein the communication request identifies a second wireless communication device having second location information as a destination for the communication session. The method also includes transmitting one or more available unlicensed frequencies corresponding to the first location information and the second location information. Further, the method includes receiving an interference level for each of the available unlicensed frequencies. Additionally, the method includes identifying one or more available unlicensed frequencies based on the determined interference level of each of the available unlicensed frequencies for establishing a peer-to-peer (P2P) communication.

In a further aspect, a method of receiving venue-specific information comprises obtaining, at an access terminal and from a first base station operating on a licensed frequency, broadcast channel information for a second base station operating in an unlicensed spectrum. The method also includes tuning to the broadcast channel of the second base station based on the broadcast channel information. Further, the method includes receiving a venue-specific message on the broadcast channel. Additionally, the method includes storing or presenting the venue-specific message.

Other aspects of any of the above-noted methods include at least one processor comprising modules configured to perform the above-noted method acts, or a computer program product comprising a computer-readable medium comprising instructions to perform the above-noted method acts, or an apparatus comprising means for performing the above-noted method acts, or a base station or a network component such as a server or an access terminal each comprising a processor configured to perform the above-noted method acts.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 3-5 are schematic views of aspects of hybrid WWAN technology-specific architectural hierarchies of the system of FIG. 1;

FIG. 12 is a schematic diagram of an aspect of movement of an access terminal within the network of FIG. 1;

FIG. 13 is a schematic diagram of an aspect of movement of an access terminal with the network of FIG. 1, including an additional non-whitespace base station;

DETAILED DESCRIPTION

Figure 1:
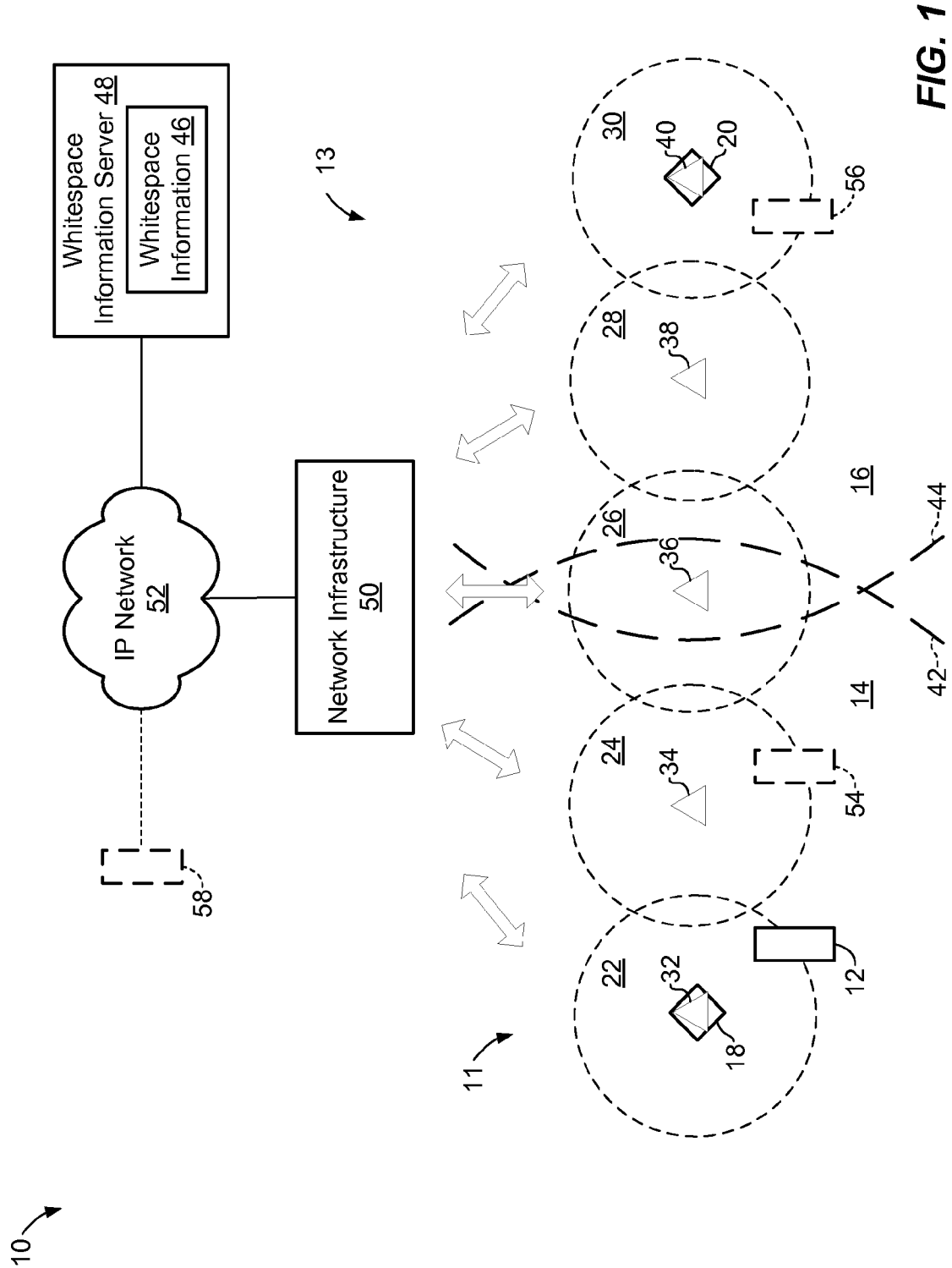
FIG. 1 is a schematic view of an aspect of a hybrid communication network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described apparatus and methods of communication relate to a communication system having communication devices operable in one or more bands of available, unlicensed frequency spectrum, referred to as "whitespace." For example, in the United States, whitespace corresponds to frequencies previously exclusively occupied by broadcast analog television signals, for example, in various frequency bands ranging from about 54 megahertz (MHz) to about 800 MHz. The amount of whitespace available varies from one geographic region to another, depending on the number of broadcasters in an area. For example, there may be more whitespace available in rural areas and less available in urban areas.

The described apparatus and methods utilize cooperating whitespace and non-whitespace networks to increase capacity for mobile broadband services, such as cellular voice calls and data calls. In particular, the described aspects include a hybrid communication network in which an unlicensed whitespace wide area network works together with a licensed cellular wide area network, to provide mobile broadband services. In other words, the cooperating networks are unlicensed WWANs and licensed WWANs. For example, such WWANs may have ranges of greater than 100 meters, or greater than 200 meters, or greater than 500 meters, and such range may extend to about 3 or to about 5 kilometers. Although long range deployments are typical, such wireless wide area networking technologies may be deployed over short ranges of a few hundred meters or a few tens of meters or less, such as in picocells or femtocells.

In one aspect, for example, the described apparatus and methods are operable to dynamically partition network access, or communication services, or both, for an access terminal (AT) between a whitespace (WS) network and a non-whitespace (NWS) or cellular network. The partitioning may be based on one or any combination of AT-related constraints or network-related (WS network and/or NWS network) constraints. In particular, a hybrid AT may communicate with a NWS network in order to obtain connection information for the WS network, and to further obtain information on the partitioning of network access and/or communication services for the AT between the WS network and the NWS network. Thus, this aspect allows the AT to utilize the NWS network to access the WS network, and to communicate with either or both networks, depending on the desired communication service and/or the given AT-related and/or network-related constraints.

In a further aspect, for example, once a whitespace communication call is established, the described apparatus and methods are operable to exchange communication session information to perform handoffs of whitespace communication calls between whitespace base stations (WS BS's) with the assistance of a non-whitespace base stations (NWS BS), e.g. a cellular eNodeB's or a base station, or handoffs between a WS BS and a NWS BS. In particular, the NWS BS may maintain information on neighboring WS BS's and their operating frequencies to enable the NWS BS to assist the AT in determining an available WS BS for handoff of the whitespace communication call. In other aspects, the handoff may be from a WS BS to a NWS BS, for example, when the AT is not within range of another WS BS, and the NWS BS may maintain the call until the AT reaches another WS BS service area. In a further aspect, the handoff may be between different sectors, and different WS operating frequencies, of a WS BS, for example, where the service area surrounding a WS BS may be covered by 3 different, potentially slightly overlapping, pie-shaped (in two dimensions) WS BS sectors, where each sector operates in a different WS frequency band to avoid interference. Thus, this aspect provides a mechanism for handoff of a whitespace communication call from one WS BS to another, or to a NWS BS, or between sectors of a WS BS.

In another aspect, for example, the described apparatus and methods are operable to cache whitespace information at one or more levels of a NWS network infrastructure. In particular, whitespace information may include, but is not limited to, one or more data relating to identification of registered WS transmitters, e.g. an analog television broadcaster, the corresponding broadcasting frequencies or spectral ranges of the registered transmitter, and WS service provider information, such as identification of WS BS's, the geographic service area of the WS BS, the operating frequencies of the WS BS, and the communication services available from the WS BS. The cached whitespace information may be obtained from a whitespace information server, which may be described as the master server or the entity that maintains the official version of the whitespace information. As such, the cached whitespace information may be maintained and updated at the one or more levels of the NWS network infrastructure according to various mechanisms. Thus, this aspect reduces load at the whitespace information server by distributing the whitespace information at one or more levels of the NWS network infrastructure, thereby reducing latency for the delivery of whitespace information to whitespace devices, such as an AT seeking to establish a whitespace communication.

In yet another aspect, for example, the described apparatus and methods are operable to enable WS peer-to-peer (P2P) communication between two AT's with assistance from one or more NWS BS's. In particular, one or more NWS BS's may supply whitespace information to two or more AT's having a desire to establish a call within the same whitespace communication service area. Each AT utilizes the whitespace information to determine available whitespace and a corresponding level of interference. Based on these determinations, the AT's select an available whitespace frequency for a P2P communication call. Further, the AT's may periodically update the determination of the level of interference in the selected available whitespace, and if such interference exceeds a threshold, the AT's may repeat the selection process based on the received whitespace information, or based on newly received updated whitespace information from either the NWS BS or the WS BS, in order to switch to a different available whitespace frequency. Thus, this aspect provides an efficient, scheme for P2P whitespace communication assisted by NWS or WS WWANs, where an AT utilizes the NWS BS-provided whitespace information to consume substantially less energy to find a suitable whitespace frequency than would be consumed if the entire whitespace spectrum were evaluated.

Additionally, in another aspect, in any communication between the AT and the WS BS, it is possible that incremental renegotiation of the WS frequency may occur. For example, the WS BS may have the ability to use multiple WS frequency bands at the same time. So, if the AT has a problem with one frequency band, e.g. in sensing the spectrum, the AT senses that a microphone is present or senses some other interference, then the AT could ask the WS BS for a different available WS frequency band. If the interference were strong enough to cause the AT to lose the ability to communicate with the WS BS, then such renegotiations may be routed from the AT to the NWS BS to the WS BS, thereby utilizing the NWS communication link.

Moreover, in an aspect, the hybrid communication system may allow venue-specific broadcasting of information, referred to as venue-casting, by a whitespace base station. For example, the AT may communicate with the NWS BS to obtain information on WS BS's in the vicinity of the AT. Such information may include broadcast frequency or channel information. Upon receiving the broadcast frequency or channel information, the AT may tune to the respective frequency/channel and obtain a broadcast of one or more venue-specific messages. Since the WS BS may have a relatively large service area, the broadcast may include many different venue-specific messages for geographically different areas within the WS service area. As such, in some aspects, the AT may filter the one or more venue-specific messages, based on the AT location, so that only venue-specific messages relevant to the AT are stored. In other aspects, the AT may identify the venue-specific messages to a user of the AT so that a selection of venue-specific messages may be received from the user. In still another aspect, the AT may include logic for automatically selecting which venue-specific messages to store. For example, the AT may include user preferences, e.g. user-entered or automatically determined, e.g. based on historical user interactions, areas of interest to the user, and the AT may then compare metadata defining the venue-specific messages to the user preferences in order to find a match, and then save the matching venue-specific messages. In any case, one or more of the venue-specific messages may be output for consumption by the user, or may be stored for selective recall by the user.

Referring to FIG. 1, in one aspect, a hybrid communication system 10 includes a whitespace (WS) network 11 operating in cooperation with a non-white space (NWS) network 13 to enable communications for an access terminal (AT) 12. Whitespace network 11 includes at least one WS service area serviced by at least one WS base station (WS BS), such as WS service areas 14 and 16 serviced by respective WS BS's 18 and 20. Further, non-white space (NWS) network 13 includes at least one NWS service areas serviced by at least one NWS BS, such as NWS service areas 22, 24, 26, 28 and 30 serviced by respective NWS BS's 32, 34, 36, 38 and 40. It should be noted that WS service areas 14 and 16 completely encircle WS BS's 18 and 20, respectively, but for the ease of illustration, the boundaries 42 and 44 of WS service areas 14 and 16 only partially encompass WS BS's 18 and 20. Additionally, it should be noted that for the ease of illustration, WS BS's 18 and 20 and NWS BS's 32, 34, 36, 38 and 40 are linearly aligned and spaced such that their respective service areas overlap however, the BS's and their corresponding service areas are positionable in other configurations, which may vary depending on a preference of a network operator. Moreover, it should be noted that NWS BS's and WS BS's may be separate, or may be integrated into a hybrid unit.

In hybrid system 10, AT 12 is operable to communication with at least one NWS BS, such as NWS BS 32, to obtain whitespace information 46 either directly from a whitespace information server 48 via a network infrastructure 50 and Internet Protocol network 52, or directly from storage on the NWS BS. Based on whitespace information 46, AT 12 may communicate with one or more other devices within the same whitespace service area, such as terminal 54, in a different whitespace service area, such as terminal 56, or across one or more networks, such as terminal 58. Such communication may include one or more communication services, and may utilize an available WS frequency, a NWS frequency, or any combination thereof.

Figure 2:
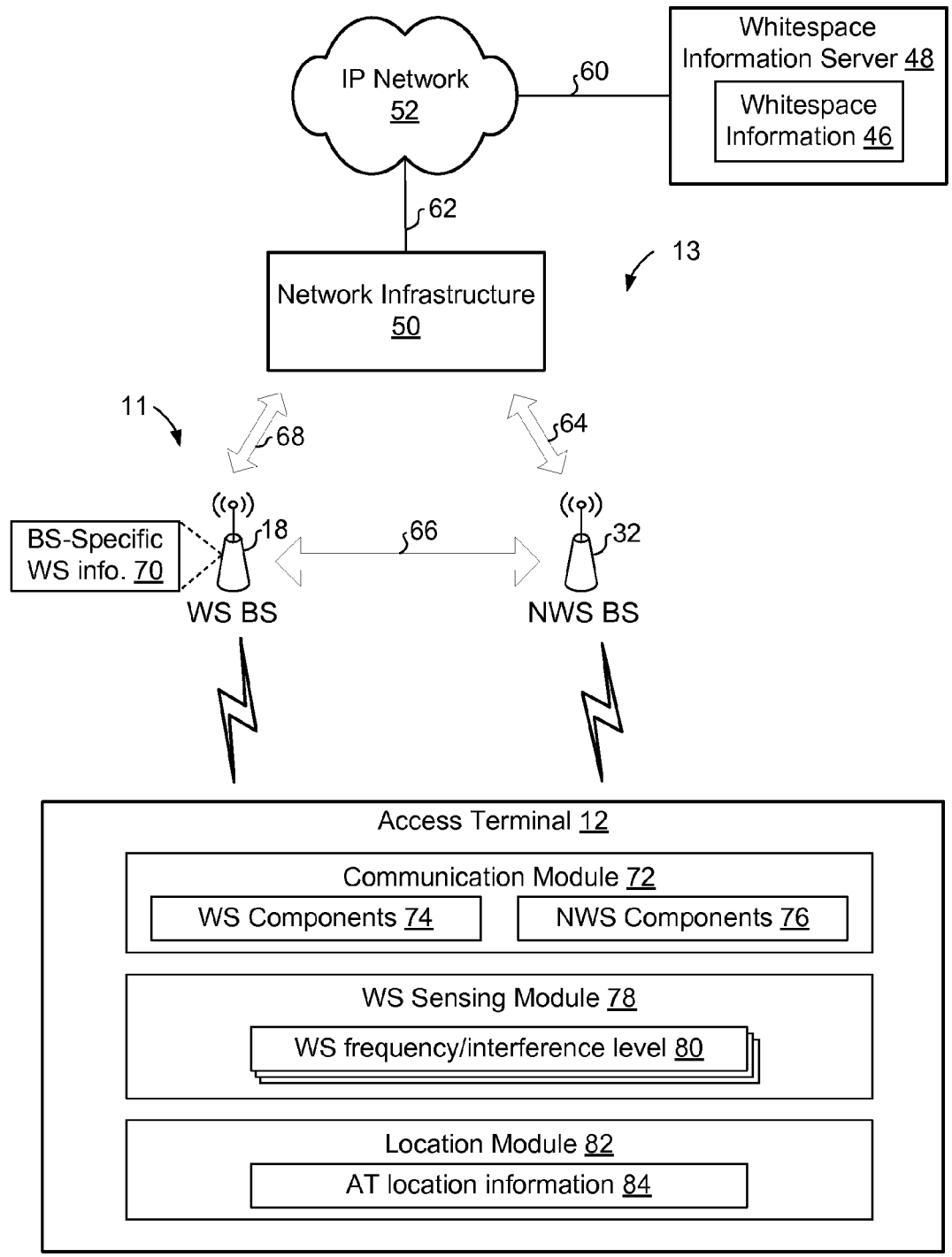
FIG. 2 is a schematic view, similar to FIG. 1, and including additional system details.

Referring to FIG. 2, in more detail, whitespace information server 48 is operable to manage and update whitespace information 46 for a given geographic region. For example, the given geographic region may include, but is not limited to, one or any combination of at least one city, at least one district, at least one state, at least one country, etc. As noted above, whitespace information 46 may include, but is not limited to, one or more data relating to identification of registered WS transmitters, e.g. an analog television broadcaster, the corresponding broadcasting frequencies or spectral ranges of the registered transmitter, and WS service provider information, such as identification of WS BS's, the geographic service area of the WS BS, the operating frequencies of the WS BS, and the communication services available from the WS BS. As such, whitespace information 46 may include information on whitespace to avoid in a given geographic area and information on available whitespace in a given geographic area.

IP network 52 is connected to whitespace information server 48 by one or more communication links 60, such as wired and/or wireless links. IP network 52 includes a packet switched network, such as, but not limited to, the Internet.

Network infrastructure 50 is connected to IP network 52 by one or more communication links 62, such as wired and/or wireless links. Network infrastructure 50 includes the backhaul or network-side portions of a communication network corresponding to at least one of NWS BS 32 or WS BS 18. Although NWS BS 32 and network infrastructure 50 may be any technology, one suitable technology includes cellular or WWAN network technology. For example, network infrastructure 50 may include, but is not limited to, network components corresponding to one or any combination of a 3G network, a Long Term Evolution (LTE) technology network, a 4G network, etc. Such a cellular or WWAN network provides a coherent and widely available connectivity backbone to operate in conjunction with a WS network, which may have widely varying service areas and capabilities.

NWS BS 32 may include any base station operating according to a NWS protocol and in communication with network infrastructure 50, such as via a wired or wireless communication link 64. Furthermore, NWS BS 32 is operable to communicate wirelessly, or over-the-air, with AT 12 having NWS communication capabilities. NWS BS 32 operates according to cellular or WWAN over-the-air protocols when communicating with AT 12, and with cellular or WWAN infrastructure protocols when communicating with network infrastructure 50 or other BS's. Additionally, in some alternatives, NWS BS 32 may communicate with WS BS's, such as WS BS 18, using either cellular or WWAN infrastructure protocols or WS protocols. For example, in some optional cases, the described aspects may enable a communication tunnel 66 to be formed between NWS BS 32 and WS BS 18 such that communications data may be exchanged. For example, tunnel 66 may be used in handoff processing, e.g. to insure no data packets originating from or destined for AT are missed while the handoff is performed, or tunnel 66 may be used for exchanging other management communications, e.g. whitespace information, BS capability information, NW and NWS network capability information.

WS BS 18 may include any base station operating according to a WS protocol and in communication with network infrastructure 50, such as via a wired or wireless communication link 68. WS BS 18 may service one or more communication sessions for one or more AT's across one or more networks. Each WS BS, such as WS BS 18, may include BS-specific whitespace information 70, such as but not limited to one or more of an WS BS identifier, a WS BS location, one or more whitespaces frequencies on which the WS BS can operate, one or more types of communications services that can be supported by the WS BS, one or more available whitespace frequencies in the respective WS service area of the WS BS, information for identifying, locating and connecting to neighboring WS BS's, and any other information that may be helpful in establishing a whitespace communication. Each WS BS may be operable to communicate its BS-specific information 70 to whitespace information server 48, which may include such information as a part of whitespace information 45.

AT 12 includes any type of mobile, wireless device having a communication module 72 enabling AT 12 to communicate with either or both of NWS BS 32 or WS BS 18. For example, communication module 72 may include separate or integrated hardware and software, such as WS communication components 74 and NWS communication components 76. For example, communication module 72 may include one antenna for each of the WS and NWS transmit and receive chains, or a single antenna and corresponding hardware and software to enable scheduling of time-sharing communication with both NWS network and WS network. Further, for example, communication module 72 may include separate or integrated protocols stacks for processing data packets.

Further, AT 12 may additionally include a WS sensing module 78 operable to scan whitespace frequencies, and measure and store a value of a WS frequency interference level 80 for one or more whitespace frequencies. In other words, WS sensing module 78 utilizes a receiver from WS components 74 to listen for broadcast transmissions on one or more whitespace frequencies. Such whitespace frequencies may be provided to WS sensing module 78, such as from whitespace information server 48 and/or NWS BS 32, or WS sensing module 78 may be operable to scan and measure all possible whitespace frequencies. AT 12 may then utilize the collected WS frequency interference level 80 in order to select from a plurality of available whitespace frequencies for establishing a whitespace communication call. Alternatively, AT 12 may forward WS frequency interference level 80 information to the network for network storage and decision making.

Additionally, AT 12 may include a location module 82 operable to obtain or determine AT location information 84, such as but not limited to a position or geographic location of the AT. For example, location module 82 may operate in conjunction with a transmitter and receiver of communication module 84 to obtain timing signals from satellites, such as NAVSTAR GPS, GLOSNASS, BEIDOU or GALILEO system satellites, and/or from terrestrial based devices, such as network devices including, but not limited to NWS BS 32 and/or WS BS 18. Location module 82 may then calculate AT location information 84 based on these signals, e.g. by triangulation or trilateration, or may forward these signals to a network-based position-location entity for such calculations in order to receive remotely-determined AT location information 84. For example, AT location information 12 may include, but is not limited to, one or more of: a geographic position, such as a longitude, latitude and optionally an elevation and/or velocity and/or direction; a network location, such as a location corresponding to a base station or cell; or topographical location such as an identification of a name or identifying information of region, natural geographic feature, block, street address, building name, or any other understandable identification of a location. As discussed further below, AT location information 84 may be utilized in the present apparatus and methods to identify available or unavailable whitespace frequencies in the vicinity of the AT, and/or to identify WS BS's serving the area within which the AT is located.

Although FIGS. 1-2 illustrate a hybrid system of WS network 11 and NWS network 13 merged at the level of network infrastructure 50, for example, hierarchically located above the level of WS BS 18 and WS BS 32, it should be noted that hybrid WWAN structure of WS network 11 and NWS network 13 may be merged at any hierarchical level. Additionally, it should be noted that WS network 11 and NWS network 13 may utilize the same technology, such as cdma2000, UMTS, LTE, etc., or they may utilize different technologies. In either case, however, there may be some merging of the respective networks as some hierarchical level.

For example, referring to FIGS. 3-6, hybrid networks 15, 17 and 19 represent different combinations of WS network 11 and NWS network 13 with the same or different network technologies. Further, the dashed lines interconnecting each hierarchical layer indicate that the respective networks may be merged at any hierarchical level, although the at the lowest level, e.g. at base stations 18 and 32, the merging may include, but is not required to include, the integration or co-location of the respective base stations. In some aspects, however, even though base stations 18 and 32 of the respective networks 11 and 13 may be co-located, the data packets carried by the respective network architectures may not merge until reaching some higher network level.

Referring to FIG. 3, hybrid WWAN network 15 includes WS network 11 and NWS network 13 both utilizing the same technology, e.g. UMTS technology. The respective hierarchical levels may include one or any combination of the network components such as a radio network controller (RNC) 23 and/or 33 respectively in communication with NodeB's 18 and 32. A serving GPRS support node (SGSN) 25 and/or 35 respectively in communication with RNC 23 and/or 33. A gateway GPRS support node (GGSN) 27 and/or 37 respectively in communication with SGSN 25 and/or 35. A packet data network gateway (PDNGW) 29 and/or 39 respectively in communication with GGSN 27 and/or 37, and further in communication with IP network 52.

Referring to FIG. 4, hybrid WWAN network 17 includes WS network 11 and NWS network 13 both utilizing the same technology, e.g. LTE technology. Hybrid network 17 is similar to hybrid network 15, however, the respective RNC functionality is combined into the base station, thereby defining respective enhanced NodeB's (eNodeB) 18 and 32.

Referring to FIG. 5, hybrid WWAN network 17 includes WS network 11 and NWS network 13 each utilizing different technologies, such as but not limited to UMTS technology in WS network 11 and LTE technology in NWS network 13. It should be noted that in a different technology combination of WS network 11 and NWS network 13, each network may utilize any different technology relative to the other network. Additionally, in differing technology hybrid WWAN network 17, as the LTE-based eNodeB 32 includes the functionality of an RNC, the eNodeB 32 may be integrated or co-located with both the UMTS-based RNC 23 and NodeB 18 of WS network 11.

Additionally, referring to FIGS. 3-6, it should be noted that tunnel 66 (FIG. 2) may be formed at any one or more hierarchical levels of the hybrid architecture.

Dynamic Access and/or Service Partitioning

Referring to FIGS. 6-11, in separate or combined aspects, the described apparatus and methods are operable to dynamically partition communication services for AT 12 between WS network, serviced by WS BS 18, and NWS network, serviced by NWS BS 32, or a combination of both. More specifically, the partitioning of communication services may include partitioning access to a network, such as between a WS network or a NWS network, or partitioning individual types of communications services between a WS network and a NWS network, or a combination of both.

Figure 6:
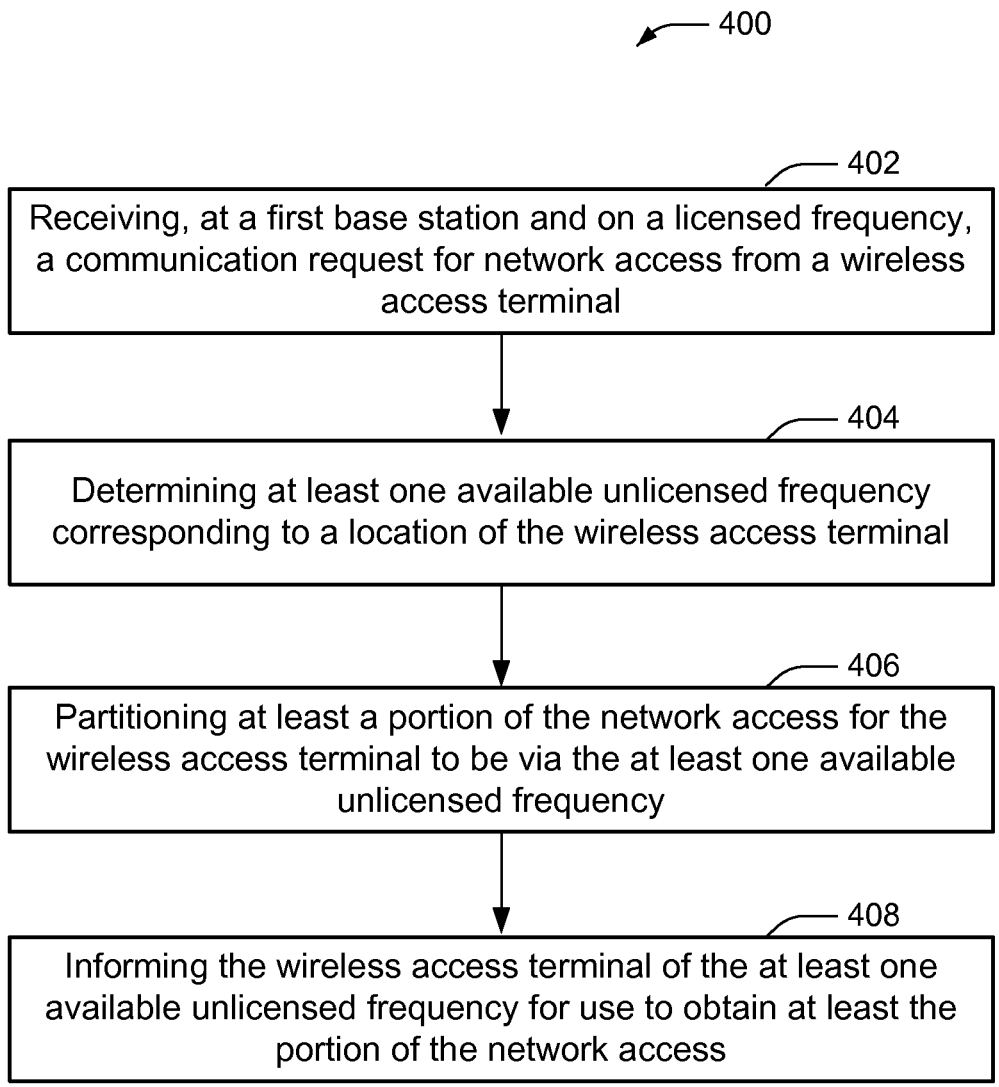
FIG. 6 is a flowchart of an aspect of a method of dynamically partitioning network access and/or services.

Referring to FIG. 6, in an aspect, a method 400 of providing communication services comprises receiving, at a first base station and on a licensed frequency, a communication request for network access from a wireless access terminal (Block 402). For example, upon power up or upon moving into an area serviced by a NWS BS, an AT detects a pilot signal of the NWS BS and based thereon attempts to establish communication with the NWS BS.

Further, the method includes determining at least one available unlicensed frequency corresponding to a location of the wireless access terminal (Block 404). For example, the NWS BS may obtain information on surrounding WS BSs in order to determine how to handle ATs in the vicinity of the NWS BS and the one or more WS BSs.

Also, the method includes partitioning at least a portion of the network access for the wireless access terminal to be via the at least one available unlicensed frequency (Block 406). For example, the NWS BS may determine that it is desirable to utilize the capability of a WS BS to handle communications with the AT. One or more factors may be considered to make this determination, such as BS load, requested quality of service (QoS) by the AT, airlink quality between the AT and the BS, etc.

Additionally, the method includes informing the wireless access terminal of the at least one available unlicensed frequency for use to obtain at least the portion of the network access (Block 408). For example, the NWS BS sends a message to the AT that provides the AT with data for accessing a network or a network service, either via the WS BS or the NWS BS, or some combination of both.

Figure 7:
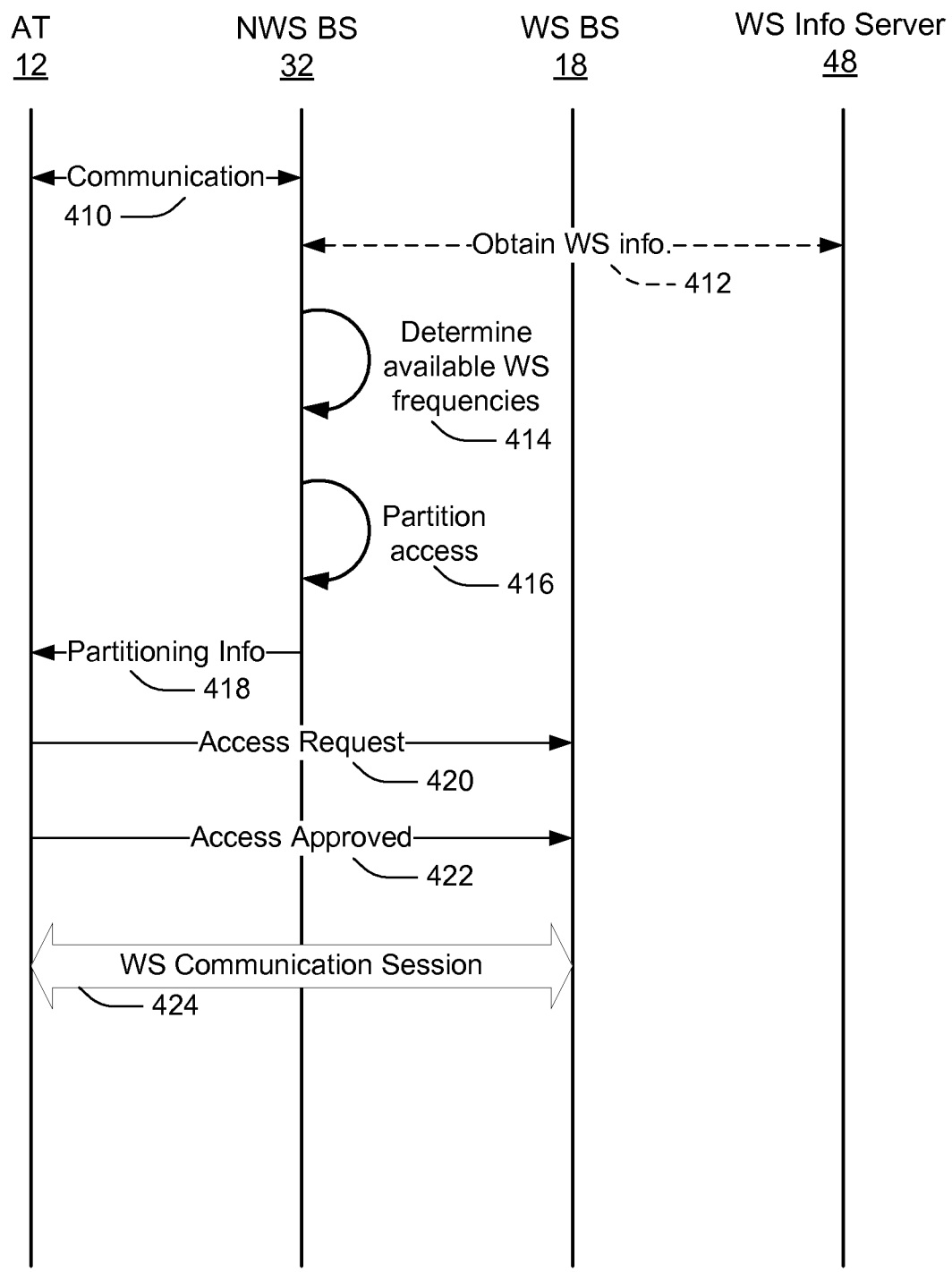
FIG. 7 is a message flow diagram relating to an aspect of a method of dynamically partitioning network access.
Figure 9:
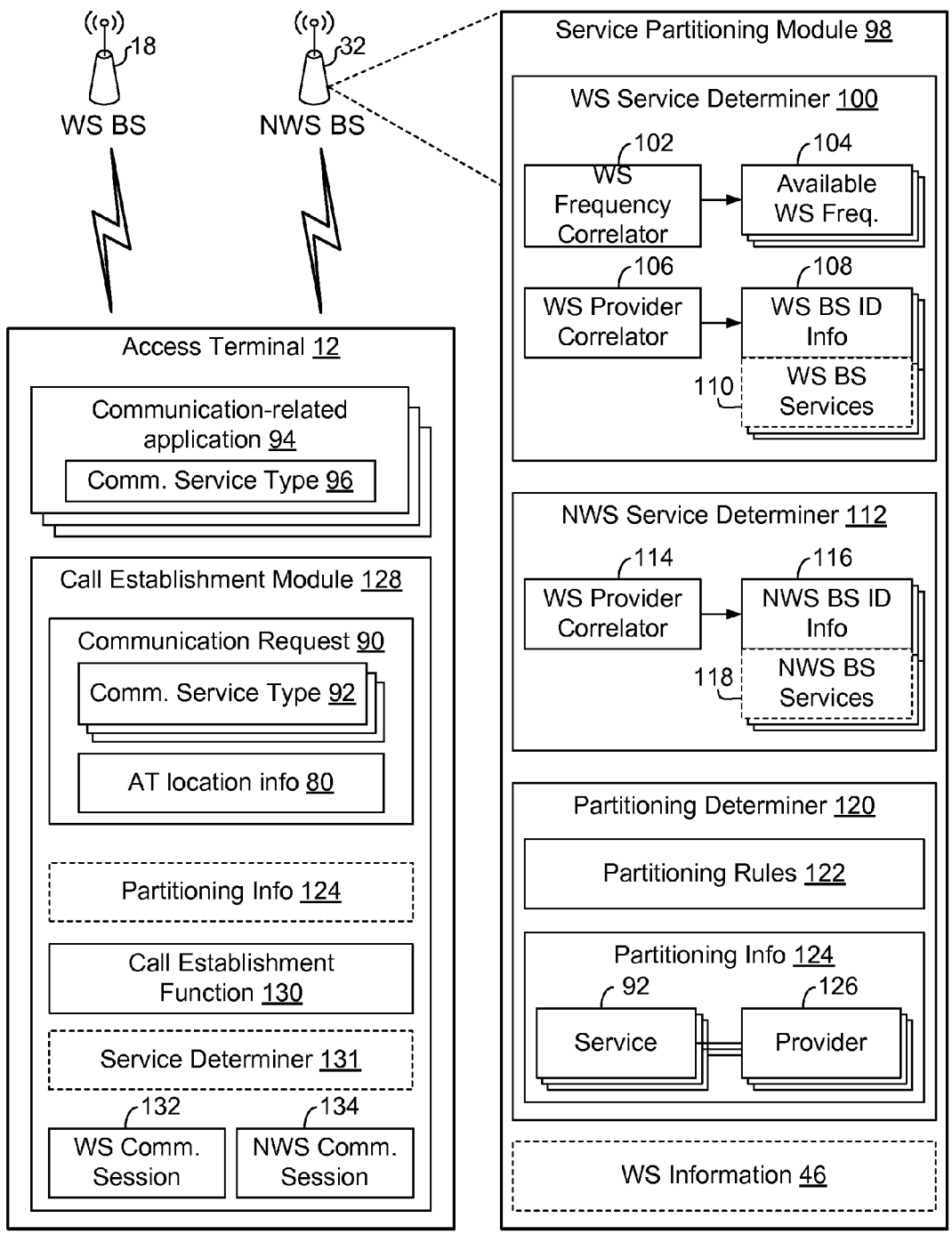
FIG. 9 is a schematic diagram of an aspect of the logical components of the access terminal and non-whitespace base station operable to perform the method of FIGS. 6-8.

Referring to FIGS. 7 and 9, as an example in a WCDMA/ UMTS system, access partitioning can be accomplished by allowing AT 12 to communicate with NWS BS 32, at 410, for example over a shared RACH (random access channel) in the NWS spectrum. Optionally, at 412, NWS BS 32 may obtain WS information, such as available WS BS's and corresponding frequencies, access information, etc., from WS information server 48. Further, at 414, NWS BS 32 determines available WS frequencies that may be utilized by AT. For example, NWS BS may include a partitioning module 98 having a WS service determiner 100 executing a WS frequency correlator 102 operable to identify one or more available WS frequencies 104 for use by AT 12 based on AT location information 80.

Additionally, at 416, NWS BS 32 determines to partition the providing of network access to AT 12, such as between NWS BS 32 or WS BS 18, for example, depending on parameters such as one or more of a current load of the NWS BS, or the QoS requested by the AT, or the link conditions of the AT. For example, NWS BS 32 may further include a partition determiner 120 operable to execute partitioning rules 122 to determine partitioning information 124 for partitioning network access. For instance, partitioning rules 122 may function to generate a determination to provide network access via WS BS 18, for example, if NWS BS 32 has a load exceeding a threshold, or when the QoS requested by the AT matches an available QoS in WS or does not match an available QoS of the NWS BS, or when the link conditions of the AT with the NWS BS are below a threshold. In other cases, the partitioning rules 122 may function to generate a determination to provide network access via NWS BS 18, for example, if NWS BS 32 has a load below a threshold or WS BS 18 has a load above a threshold, or when the QoS requested by the AT matches an available QoS in the NWS BS or does not match an available QoS of the WS BS 18, or when the link conditions of the AT with the NWS BS meet a threshold.

Subsequently, at 418, NWS BS 32 provides AT 12 with the partitioning information 124, for example over a FACH (forward access channel) in the NWS spectrum. In one case, for instance, the partitioning information 124 provides information to AT 12 regarding access information over WS, such as when NWS BS 32 has a load exceeding a threshold, or when the QoS requested by the AT matches an available QoS in WS or does not match an available QoS of the NWS BS, or when the link conditions of the AT with the NWS BS are below a threshold. Such partitioning information 124 can include the WS carrier frequency to use, the available WS channel bandwidth, and the available WWAN protocol to use, among other information used by AT 12 to access WS BS 32. In some aspects, the available WWAN protocol over WS could be the same as in NWS (in this case WCDMA/ UMTS), while in other cases it could be a different protocol such as LTE.

At 420, AT 12 can make an access request to WS BS 32, such as over a RACH channel in the WS spectrum, optionally including the QoS requirements of the AT. For example, AT 12 can execute call establishment module 128 to provide access request in the form of a communication request 90. At 422, WS BS 18 approves the access request over WS, and at 424 subsequently establishes dedicated radio bearers for AT 12 over WS, thereby establishing a WS communication session for the AT.

In some variants, AT 12 may directly establish dedicated bearers over WS while utilizing the RACH/FACH channels over NWS, so that the AT does not have to use RACH/FACH channels over WS at all for its access. In other variants, depending on the QoS requirements of the AT, the link conditions of the AT, or the current load on the NWS BS, the NWS BS can just retain the AT in NWS and not ask the AT to complete its access request over WS. In additional variants, the NWS BS can first complete the access request over WS, allow the AT to use dedicated bearers over WS, and as the AT's QoS requirements change or if the link conditions of the AT change or if the load in NWS reduces for the NWS BS, the NWS BS can move the AT to NWS and tear down the bearers established for it over WS. Alternatively, the NWS BS can first complete the access request over NWS, allow the AT to use dedicated bearers over NWS, and as the AT's QoS requirements or link conditions change or if the load in NWS increases for the NWS BS, the NWS BS can move the AT to WS and tear down the bearers established for it over NWS. In further variants, the NWS BS satisfies a portion of the AT's QoS requirements over NWS, and utilizes WS to satisfy the remaining requirements, so that the access request that arrived over NWS is then satisfied by using both NWS and WS simultaneously for the AT. When both NWS and WS are used for an AT, the NWS BS has the flexibility over time to repartition the wireless channel resources allocated in NWS and WS as the load on the NWS BS changes or as QoS requirements change or as link conditions change for the AT.

Figure 8:
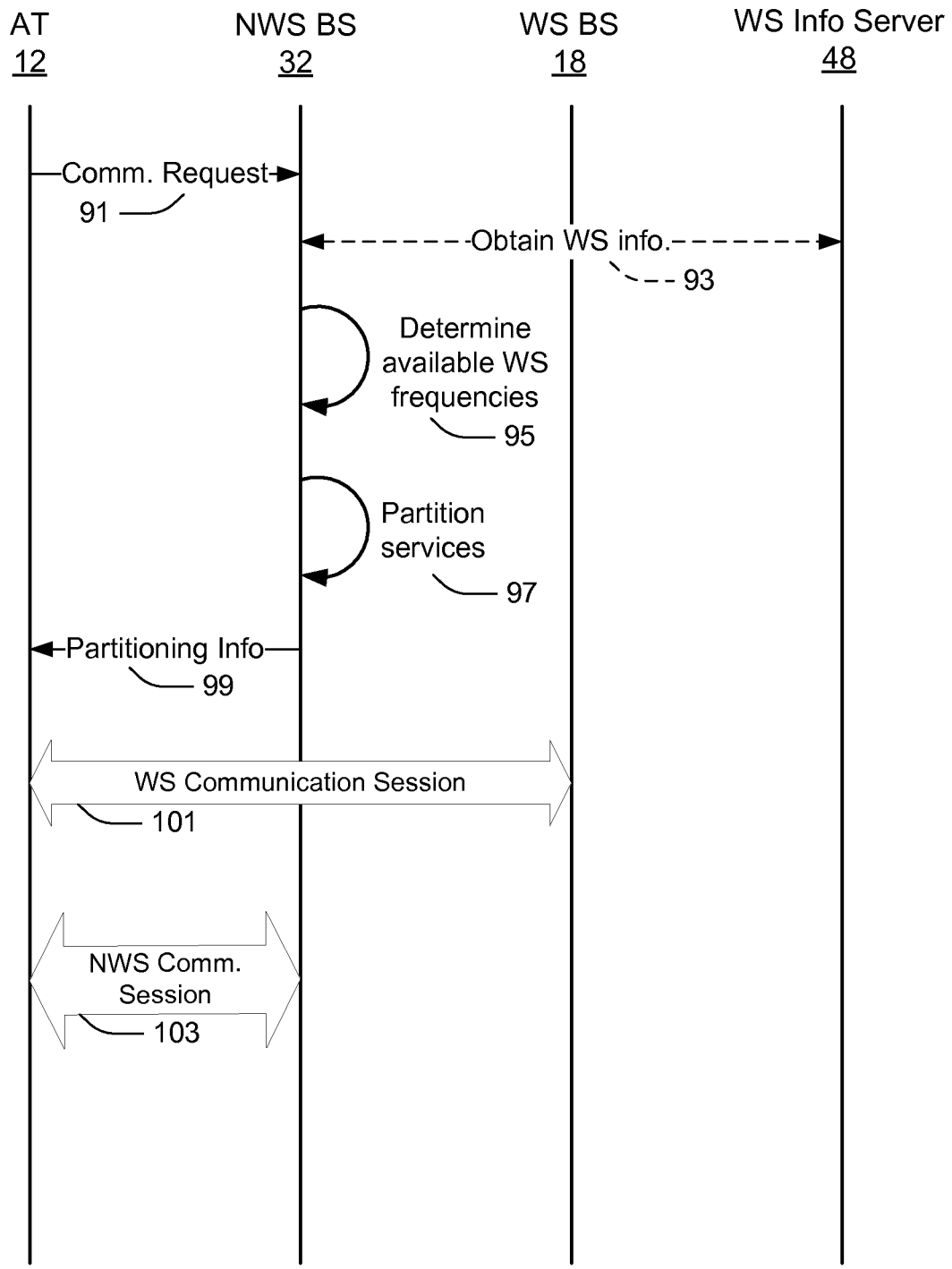
FIG. 8 is a message flow diagram relating to an aspect of a method of dynamically partitioning communication services.

Referring to FIGS. 8 and 9, in an aspect of partitioning of service types, for example, at 91, a first base station on a licensed frequency, such as NWS BS 32, receives a communication request 90 from a wireless access terminal, such as AT 12. The communication request 90 identifies a plurality of desired communication service types 92 and further comprises a location of the wireless access terminal, such as AT location information 80. For example, the plurality of desired communication service types 92 may include, but are not limited to, a best efforts service, such as may be associated with a data call, a low latency service, such as may be associated with a voice call or a real-time streaming service, and any other quality of service factor, such as desired bandwidth or throughput/goodput, latency, jitter, packet error rates, etc. Furthermore, the plurality of desired communication service types 92 may correspond to one or more communication-related applications 94 on AT 12, such as but not limited to, any combination of a voice call application, a short message service (SMS) application, an Internet browser application, a position-location application (such as may be used with location module 78, FIG. 2), a mobile widget application, and any other application executable by a processor on the AT and using communication module 72 (FIG. 2) to transmit or receive information. Further, each of the one or more communication-related applications 94 have at least one corresponding communication service type 96.

Further, at 93, NWS BS 32 determines at least one available unlicensed frequency, e.g. available whitespace, corresponding to the location of the wireless access terminal. For example, NWS BS may include a partitioning module 98 having a WS service determiner 100 executing a WS frequency correlator 102 operable to identify one or more available WS frequencies 104 for use by AT 12 based on AT location information 80. For instance, the WS frequency correlator 102 may cross reference AT location information 80 with all or some portion of whitespace information 46 obtained, for example at 95, from whitespace information server 48. It should be noted, however, that NWS BS 32 may obtain all or some portion of whitespace information 46 at any time, and not just in response to receiving communication request, and NWS BS 32 may store such obtained information for later use.

Additionally, at 97, NWS BS 32 partitions the plurality of desired communication service types for use between the licensed frequency and the at least one available unlicensed frequency.

For example, the WS service determiner 100 of NWS BS 32 may additionally include a WS provider correlator 106 that is operable to determine WS BS identification information 108 of WS BS's having WS service areas corresponding to AT location information 80, such as WS BS 18 and WS service area 14 (FIG. 1). Optionally, the WS provider correlator 106 may additionally determine corresponding WS BS services 110 for each identified WS BS 108.

Moreover, the service partitioning module 98 of NWS BS 32 may further include a NWS service determiner 112 having a NWS provider correlator 114 operable to determine NWS BS identification information 116 of NWS BS's having NWS service areas corresponding to AT location information 80, such as NWS BS 32 and WS service area 22 (FIG. 1). Optionally, the NWS provider correlator 114 may additionally determine corresponding NWS BS services 118 for each identified NWS BS 116.

WS BS services 110 and NWS BS services 118 may include information such as, but not limited to, BS service types, e.g. voice, data, etc., BS operating frequency information, service codes or keys for establishing a connection with the BS, service factors such as one or more link quality parameters, such as bandwidth or throughput/goodput, latency, jitter, packet error rates, service cost, load or usage of the respective BS, etc., and any other parameters for identifying, contacting and establishing a connection with the BS and defining available services.

In some aspects, in the case of WS BS services 110, such WS BS services 110 information may further include corresponding WS BS sector information, which includes all of the above-defined parameters for WS BS services, but identified for one or more respective sectors of a WS BS. Such sector information may be utilized for "softer" hand-offs from one sector to another within the same WS BS.

Additionally, in other aspects, in the case of WS BS services 110, such WS BS services 110 information may further include venue-specific information and messages, for instance, advertisements, marketing information, or general information relating to specific venues within the respective WS service area. For example, a venue may be an individual, an area, a building, a business, a store, a mall, an auditorium, hall, stadium, or any other entity having a desire to broadcast information within the WS service area.

Further, the service partitioning module 98 of NWS BS 32 may further include a partition determiner 120 operable to execute partitioning rules 122 to determine partitioning information 124 for the plurality of desired communication service types. In particular, the partitioning information 124 associates each of the plurality of desired communication service types 92 with a corresponding WS or NWS service provider, such as WS BS 18 or NWS BS 32, e.g. corresponding to the determined WS BS identification information 108 and the NWS BS identification information 116.

For example, the partitioning rules 122 may partition communication service types 92 based on one or more factors, such as but not limited to: network load; a service plan corresponding to AT; a service plan of the AT and the network load; a mobility (losing signal strength) of the AT and the network load; and desired quality of service and available quality of service.

At 99, NWS BS 32 informs AT 12 of the at least one available unlicensed frequency for use with a first one of the plurality of desired communication service types and of a second one of the plurality of desired communication service types for use with the licensed frequency, based on the partitioning. In other words, NWS BS 32 transmits the partitioning information 124 to AT 12.

At 101, based on the partitioning, a WS communication session 132 is established between AT 12 and WS BS 18 for a first one of the plurality of desired communication service types. For example, AT 12 may include a call establishment module 128 having a call establishment function 130 operable to establish WS communication session 132 to carry a best efforts type of communications, such as a text messaging data call or a web browsing data call, based on the received partitioning information 124.

Optionally, at 103, based on the partitioning, a NWS communication session 134 is established between AT 12 and NWS BS 32 for a second one of the plurality of desired communication service types 92. For example, the call establishment function 130 is further operable to establish the NWS communication session 134 to carry a low latency type of communications, such as a voice call or real-time streaming service. In other aspects, the second one of the plurality of desired communication service types 92 may be for a service that maintains a low overhead connection with the NWS BS 32 in order to obtain assistance, if needed, for the NWS communication session 132.

In another aspect, due to dynamic constraints and AT location-related constraints, e.g. changing WS frequency interference levels as the AT moves, WS WWAN bands dynamically may become unavailable for communication. If an AT is purely using only WS WWAN bands for communication, such dynamic unavailability may result in the drop of a call or data session. As such, in some aspects, due to the possibility of dynamic unavailability of whitespace WWAN channels, the present apparatus and methods may provide control channels for WWAN communication in a non-whitespace WWAN. Alternatively, or in addition, a low data-rate connectivity session in a non-whitespace WWAN may be desirable to maintain.

For example, the service partitioning may further include channel partitioning (for operation of the WS-WWAN) in an extended WWAN architecture that merges the WS-WWAN and the NWS-WWAN. Channels in the NWS-WWAN continue to reside in NWS-WWAN, so that the NWS-WWAN is self-sufficient. However, channels utilized for operation of the WS-WWAN may be reused in the NWS-WWAN. In particular, the present apparatus and methods may provide channel partitioning for the WS-WWAN that primarily uses the additional whitespace bands purely for the operation of data channels, and optionally for the operation of other channels. In this case, some channels such as paging, control, random access channels, and some data channels, are retained in the NWS-WWAN.

It should be noted that, in some aspects, the example of partitioning network access provided in FIG. 7 and the example of partitioning service types between networks provided in FIG. 8 may be combined.

Figure 10:
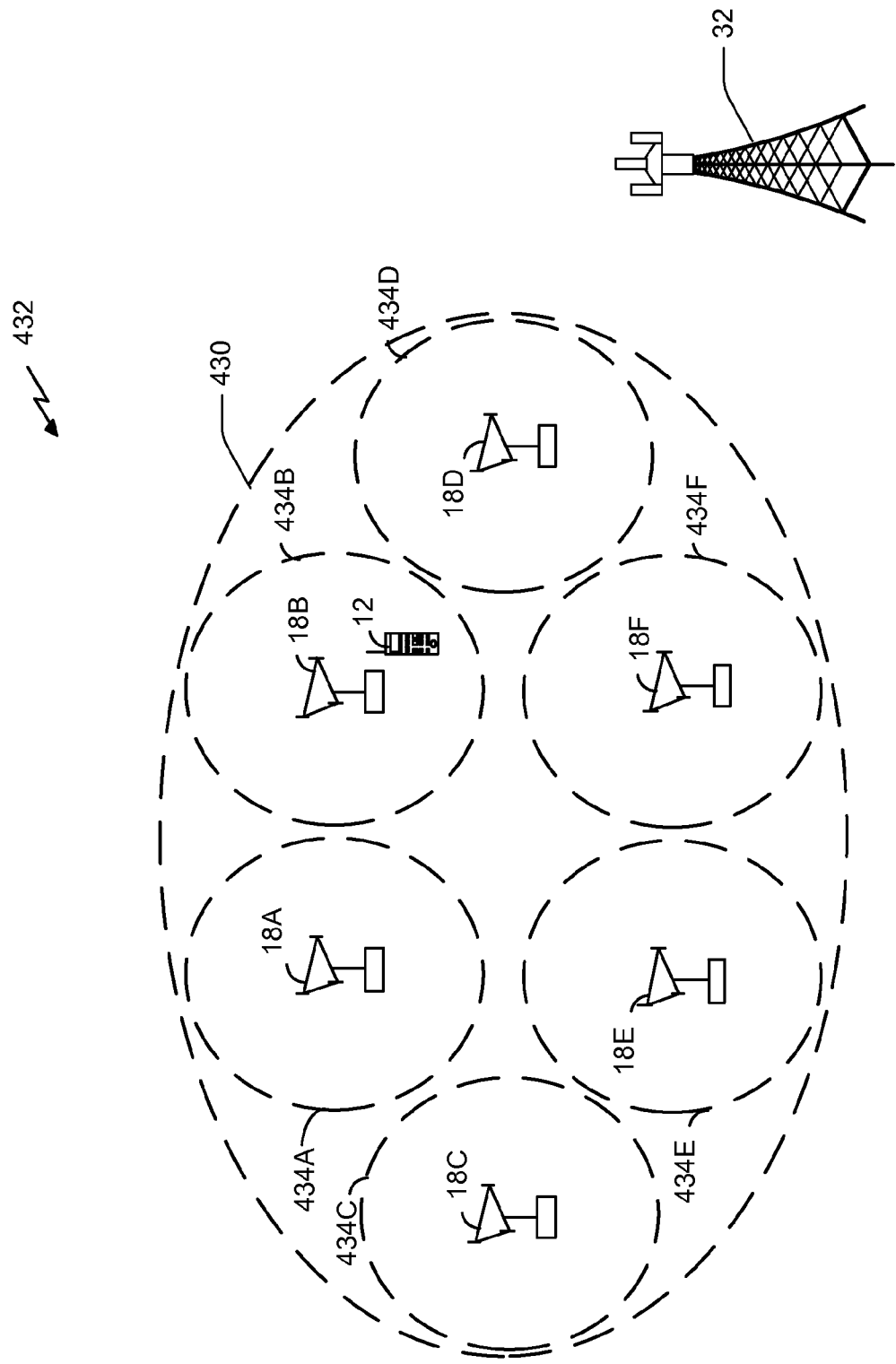
FIG. 10 is a schematic diagram of an aspect of a system of components for partitioning network access and/or services.

Referring to FIG. 10, for example, contention for access to a NWS network may be mitigated by creating ad hoc networks in WS. For example, at a special event in an event location 430, such as an event at a stadium, NWS or NWS WWAN channels of NWS BS 32 servicing event location 430 may be heavily loaded. In some cases, the actual amount of data being communicated per user may be relatively low, however, a significant amount of NWS WWAN network resources may be wasted per user for access related exchanges, bearer establishment, etc. In some aspects, a local network 432 of a plurality of local WS BSs 18A-18F are deployed to provide respective coverage areas 434A-434G to provide service to event location 430. The plurality of local WS BSs 18A-18F may be operate on the same frequencies as the macro network NWS BS 32, or on different frequencies, and the system can be configured such that NWS BS 32 directs AT's to utilize one of the plurality of local WS BSs 18A-18F for network access and/or for communication service. Alternatively, the system can be configured such that an AT may independently contact one of the plurality of local WS BSs 18A-18F for network access and/or for communication service. For example, the plurality of local WS BSs 18A-18F may be femto base stations. Thus, both NWS BS 32 and the plurality of WS BS's 18A-18F can provide service to any AT's within event location 430.

For example, in one example, the plurality of local WS BSs 18A-18F may operate on different available additional frequencies relative to the frequencies used by NWS BS 32. Also, NWS BS 32 or the plurality of local WS BSs 18A-18F may provide each AT 12 with information on available local WS BSs 18A-18F frequencies at event location 430. Then, communications module 72 on AT 12 finds one of the local WS BSs 18A-18F having a better airlink or signal strength than NWS BS 32, or at least an airlink or signal strength of a sufficient quality, and switches from communicating with NWS BS 32 to communicating with the one of the local WS BSs 18A-18F.

Further, available additional frequencies can be reused by the local WS BSs 18A-18F, based on their respective ranges, e.g. wherein the ranges avoid overlapping by an amount that would cause too much interference. This allows supporting an increased number of ATs. For example, assume that each carrier frequency can handle X users. Further, (M+1) macro BS's each operating on a different carrier frequency can support (M+1)×X users at the event location, without the local WS BSs 18A-18F, where M is a positive integer. Now assume a the local WS BSs 18A-18F deployment with carrier frequency reuse of K local WS BSs 18A-18F per carrier frequency at event location 430, where K is a positive integer. Also, assume 1 NWS BS carrier frequency and M additional carrier frequencies used by the local WS BSs 18A-18F. As such, M additional carrier frequencies can be allocated to M×K local WS BSs 18A-18F. Thus, the total number of ATs supported is ((M×K)+1)×X, and then the additional ATs supported by the addition of the local WS BSs 18A-18F is M×(K−1)×X.

In other words, referring to FIG. 10, if the local WS BSs 18A-18F have K (reuse)—2 and M (number of additional carrier frequencies)=3, then there are 4 carrier frequencies for use, and the reuse within event location 430 is 2. In other words, NWS BS 32 may use carrier frequency 1 (C1), while WS BS 18C and 18D may use carrier frequency 2 (C2), WS BS 18A and 18F may use carrier frequency 3 (C3), and WS BS 18B and 18E may use carrier frequency 4 (C4). As a result, with 1 macro and NWS BS and 6 WS BSs 18A-18E, then the number of users supported is increased by a factor of 7.

In another example, the WS BSs 18A-18F may each include a NWS WWAN radio and a WS WWAN radio, and instead of reuse of multiple carrier frequencies, the WS BSs 18A-18F can operate over the same frequency as the NWS BS 32 for WWAN operation. The AT can detect and switch to the WS BS 18A-18F with a better airlink on the carrier frequency, and then the WS BS can configure the AT to move over to an available WS WWAN carrier frequency and connect to the WS WWAN radio of the WS BS, establish bearer channels, and exchange data over the WS WWAN.

In another example, if the WS BSs 18A-18F each include a NWS radio, e.g. a femto base station having both a WWAN radio and a WLAN radio, then AT 12 may detect one of the WS BSs 18A-18F with a sufficient airlink or signal strength and connect to it. The WS BS then seamlessly informs the AT to connect to the integrated WLAN radio, for example, providing the AT with an SSID of the integrated WLAN radio and a master key. The AT can then connect to the integrated WLAN radio of the WS BS and, for example, thereby switch data traffic to the WLAN. If voice data can be received over the WLAN, e.g. circuit-switched data over packet-switched network, then the voice data can be delivered over the WLAN as well, otherwise the voice data can be delivered over the WWAN.

Figure 11:
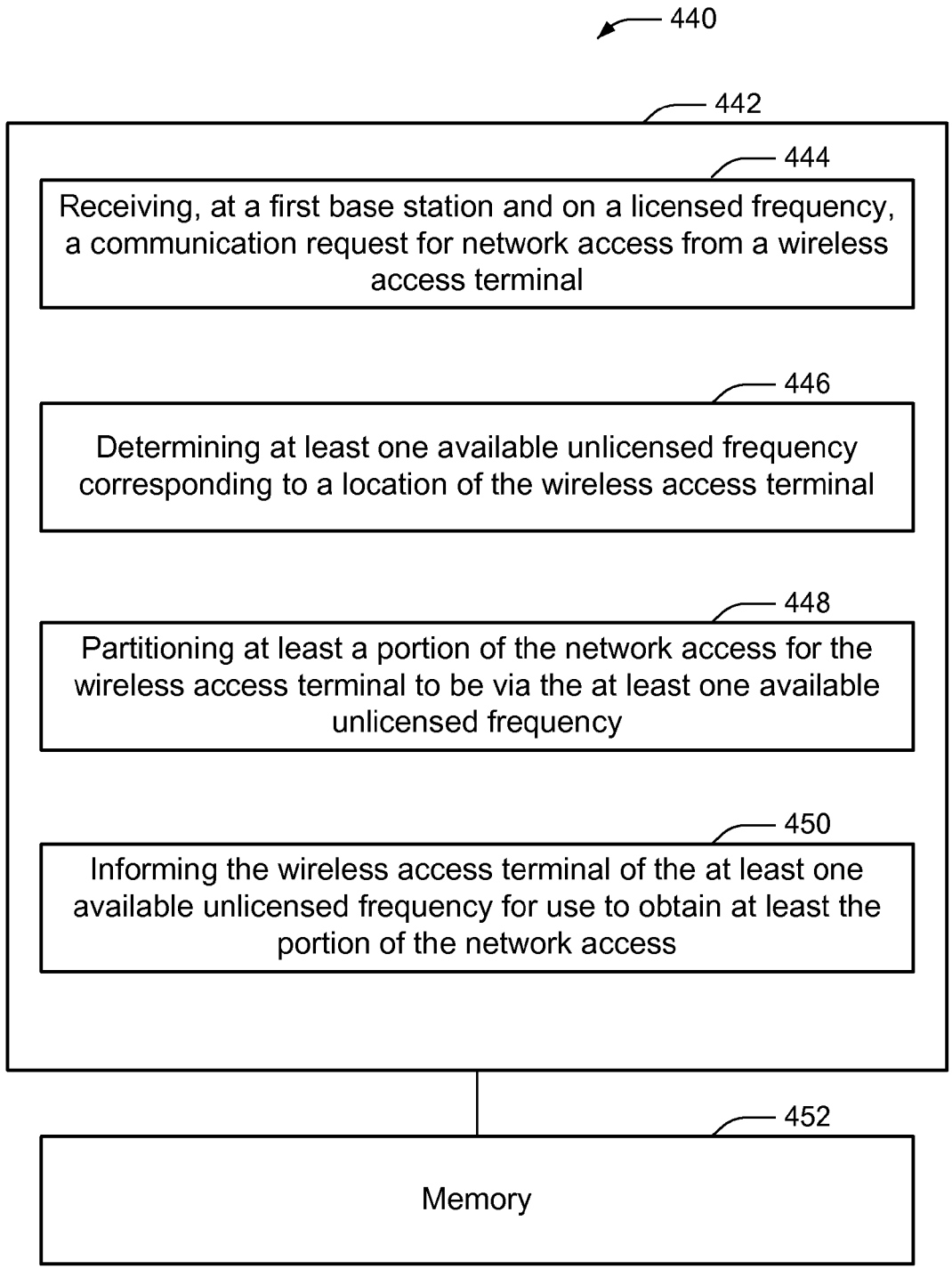
FIG. 11 is a schematic diagram of an aspect of a system of logical components for partitioning network access and/or services.

Referring to FIG. 11, illustrated is a system 440 for facilitating partitioning of network access, or network services, or both. For example, system 440 can at least partially reside within a base station, an access point, etc. It is to be appreciated that system 440 is represented as including functional blocks, which can be functional blocks that represent functions implemented by a processor, software, or combination thereof (e.g., firmware).

System 440 includes a logical grouping 442 of means that can act in conjunction. For instance, logical grouping 442 can include means 444 for receiving, at a first base station and on a licensed frequency, a communication request for network access from a wireless access terminal. Further, logical grouping 442 can include means 446 for determining at least one available unlicensed frequency corresponding to a location of the wireless access terminal. Also, logical grouping 442 can include means 448 for partitioning at least a portion of the network access for the wireless access terminal to be via the at least one available unlicensed frequency. Additionally, logical grouping 442 can include means 450 for informing the wireless access terminal of the at least one available unlicensed frequency for use to obtain at least the portion of the network access. Additionally, system 440 can include a memory 452 that retains instructions for executing functions associated with the means 444, 446, 448 and 450. While shown as being external to memory 452, it is to be understood that one or more of the means 444, 446, 448 and 450 can exist within memory 452.

Thus, this aspect allows the AT to utilize the NWS network to access the WS network, and to communicate with either or both networks, depending on the desired communication service and the given AT-related and/or network-related constraints.

NWS BS-assisted WS BS Handoff

Referring to FIGS. 12-18, in another aspect, the described apparatus and methods are operable to provide NWS BS assistance to an AT to handoff a WS communication call. In some aspects, for example, referring to FIG. 12, the handoff of the call of AT 12 moving in direction 21 may be between two WS BS's 18 and 20, such as when the respective WS service areas 14 and 16 overlap. In other aspects, referring to FIG. 13, the handoff of AT 12 moving in direction 21 may be from a first WS BS 18 to a NWS BS 41, which may maintain the call until AT 12 has reached the WS service area 16 of a second WS BS 20, upon which the NWS BS 41 hands off the call to the second WS BS 20. In other words, referring to FIG. 13, NWS BS 41 has a NWS service area 43 that bridges WS service areas 14 and 16, thereby allowing NWS BS 41 to maintain the call until AT 12 reaches WS service area 16.

Figure 14:
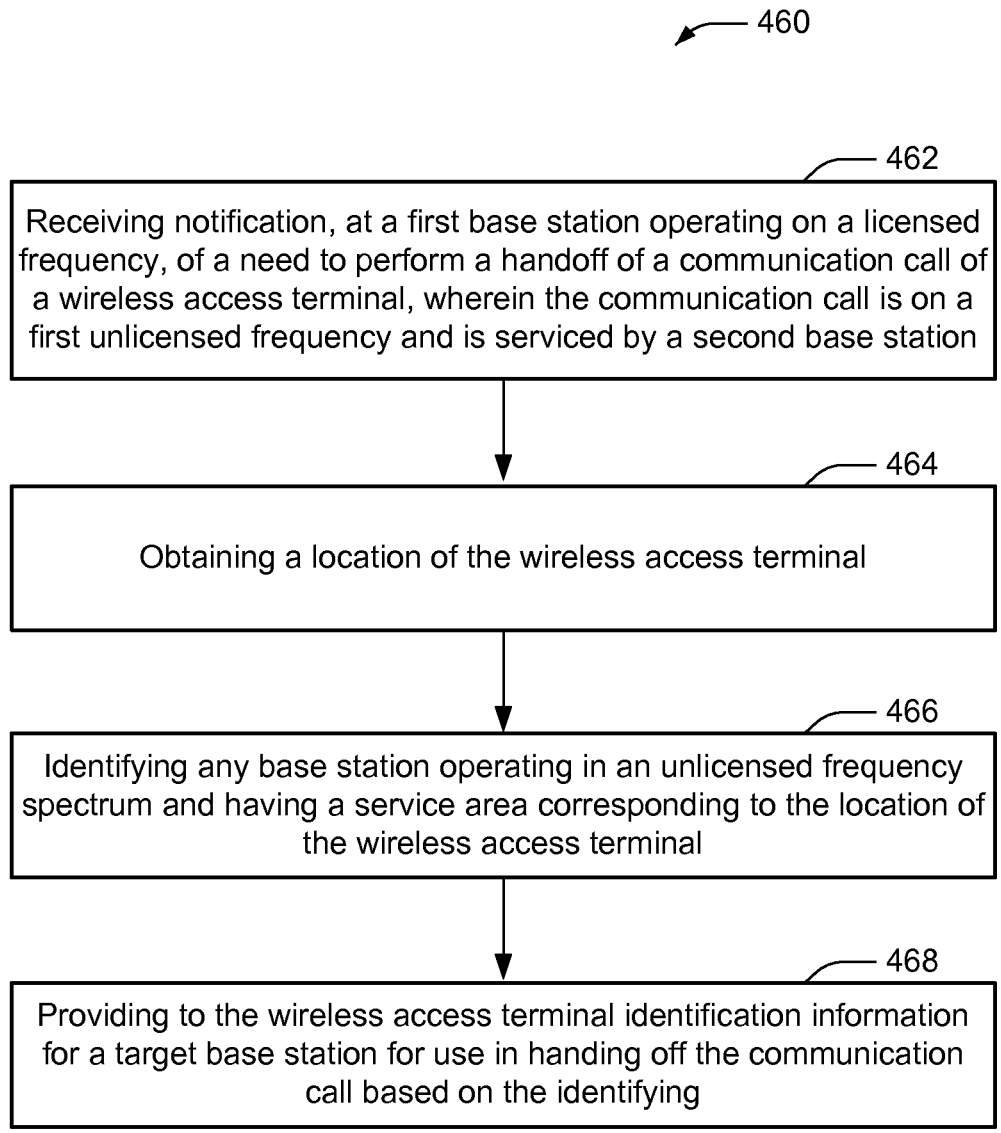
FIG. 14 is a flowchart of an aspect of a method of performing an inter-frequency handoff of a whitespace call.

Referring to FIG. 14, in an aspect, a method 460 of performing a handoff of a communication call comprises receiving notification, at a first base station operating on a licensed frequency, of a need to perform a handoff of a communication call of a wireless access terminal, wherein the communication call is on a first unlicensed frequency and is serviced by a second base station (Block 462). For example, a NWS BS may receive a handoff required message from a WS BS, or from the AT.

The method further includes obtaining a location of the wireless access terminal (Block 464). For example, the NWS BS may access a network database having location-related information for the AT, such as a position/location or a network component, e.g. a base station, that can be correlated to a position/location or to adjacent network components, e.g. base stations or access points.

Also, the method includes identifying any base station operating in an unlicensed frequency spectrum and having a service area corresponding to the location of the wireless access terminal (Block 466). For example, the NWS BS may correlate the position/location or network location of the AT with a WS BS in the same vicinity, thereby determining a target WS BS for receiving a handoff.

Additionally, the method includes providing to the wireless access terminal identification information for a target base station for use in handing off the communication call based on the identifying (Block 468). For example, the NWS BS may send a handoff message to the AT, wherein the message includes instructions or other data for use by the AT to handoff a call to a WS BS.

Figure 15:
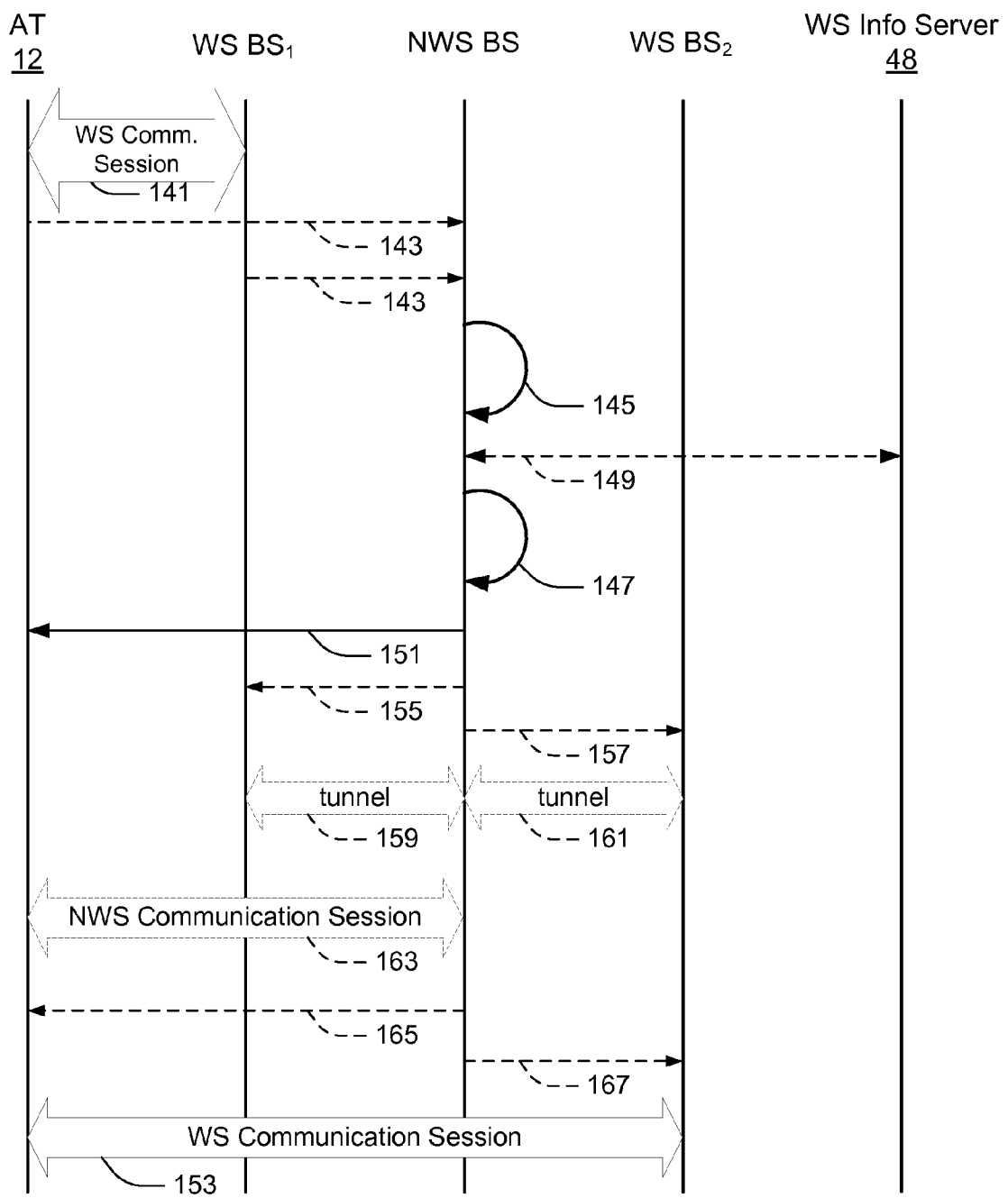
FIG. 15 is a message flow diagram relating to an aspect of a non-whitespace base station-assisted handoff of a whitespace communication session or call.
Figure 16:
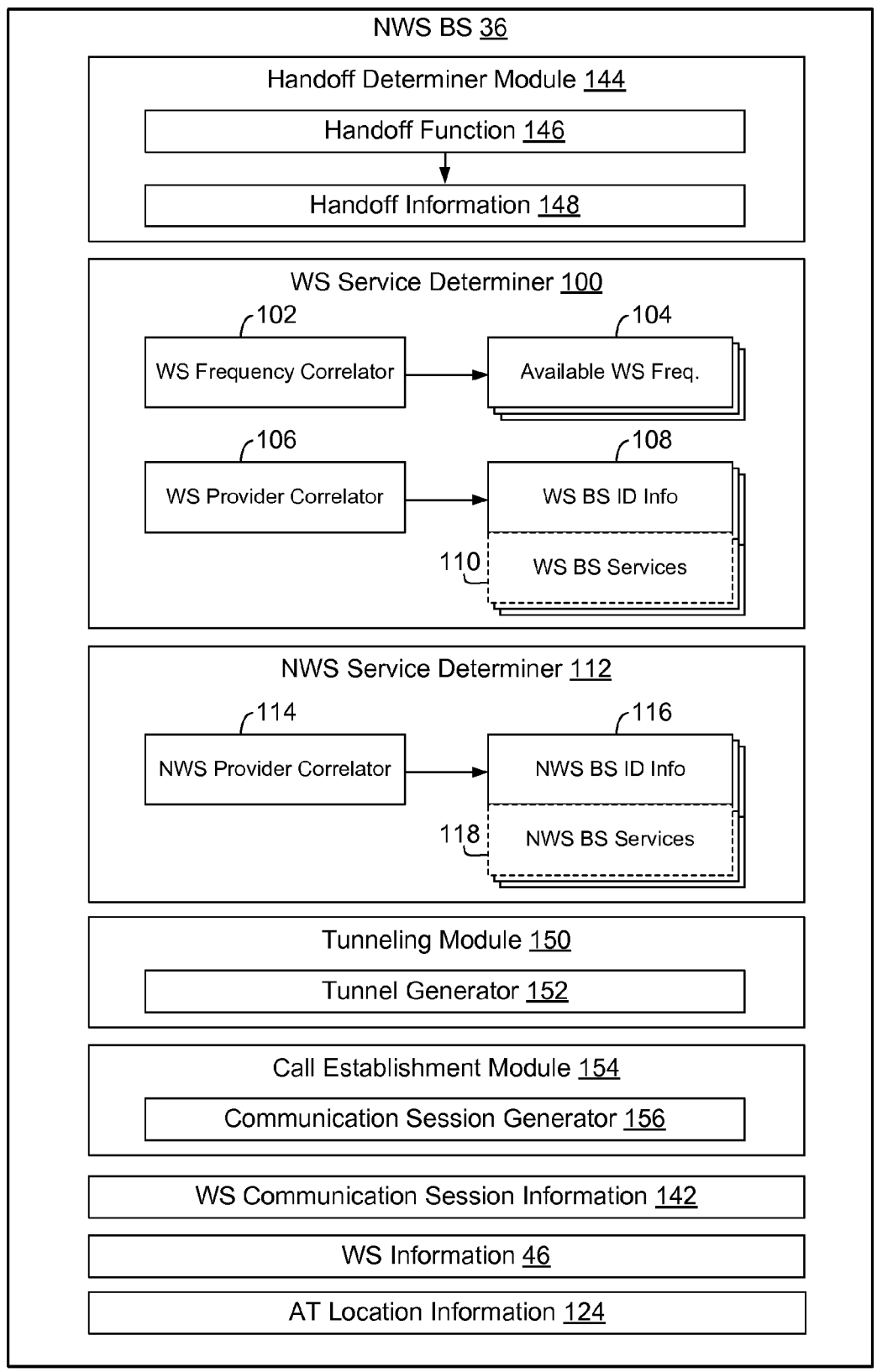
FIG. 16 is a schematic diagram of an aspect of a non-whitespace base station operable in the flows of FIGS. 14 and 15.

Further, for example, referring to FIGS. 15 and 16, at 141, a communication call on a first unlicensed frequency, such as a WS communication session, is established between a wireless access terminal, such as AT 12, and a first WS BS operating in the unlicensed spectrum, such as WS BS 18. It should be noted that for simplicity, FIG. 16 refers to NWS BS 36, although FIG. 16 is also representative of NWS BS 41, as described below. The WS communication session 141 may correspond to WS communication session information 142 that defines parameters of the session. For example, WS communication session information 142 may include, but is not limited to, one or more of a session identifier, a serving base station identifier, an AT identifier, one or more quality of service parameters, and any other factor or variable defining the communication session.

At 143, a first base station operating on a licensed frequency, such as an NWS BS, receives notification of a need to perform a handoff of the communication call 141 of AT 12. For example, the NWS BS may be NWS BS 24 is the scenario discussed in FIG. 12, or the NWS BS may be NWS BS 41 in the scenario described in FIG. 13. Further, for example, the notification may be based on a determination made by the AT or the WS BS, or even possibly by the NWS BS itself, of the need for the handoff. For instance, the notification received by NWS BS may be based on receiving a handoff request from AT 12, such as when AT 12, which maintains a connection with the NWS BS or otherwise knows how to contact the NWS BS, determines that a connection quality with WS BS 18 has dropped below a threshold, or determines that the call with WS BS 18 is in danger of being dropped, or determines that another WS BS may be able to provide a higher connection quality or more desirable quality of service than WS BS 18. Further, for instance, the notification received by the NWS BS may be based on receiving a handoff request from WS BS 18, such as when WS BS 18 determines that communication call 141 is in danger of being dropped. Alternatively, for instance, the notification received by the NWS BS may be based on any of the WS BS, AT or NWS BS receiving a location and direction of travel of AT 12, and based on stored information of the respective WS service areas 14 and 16 of neighboring WS BS's 18 and 20. In other words, in this case, any of the WS BS, AT or NWS BS may predict that the connection quality of the WS communication call 141 will be dropping and that the call may be better serviced by another BS.

Further, for example, the NWS BS may include a handoff determination module 144, which is triggered by the notification or determination of a need for the handoff, to execute a handoff function 146, which includes one or more of algorithms, rules, heuristics, etc., to perform or initiate the functionality described herein.

Additionally, at 145, the NWS BS obtains location information, including at least a location, of AT 12. For example, the NWS BS may receive the AT location information 124 as part of the handoff request received from AT 12 and/or WS BS 18. Alternatively, for example, based on execution of handoff determiner module 144 and handoff function 146, the NWS BS may query AT 12 for the AT location information 124. In another option, the NWS BS may obtain the AT location information 124 from another network infrastructure component, a network-based position-determination entity, or in any other suitable manner.

At 147, the NWS BS identifies any base station operating in an unlicensed frequency spectrum and having a service area corresponding to the location of the wireless access terminal, such as WS BS 20 having WS service area 16 in the scenario of FIG. 12. For example, handoff determiner module 144 may execute handoff function 146 to initiate communicate with WS service determiner 100 to obtain WS BS identification (ID) information 108, and optionally WS BS services information 110, corresponding to WS BS 20 and any other candidate WS BS meeting the service area criterion.

The identification of another base station operating in an unlicensed frequency spectrum and having a service area corresponding to the location of the wireless access terminal is based on an analysis of WS information 46 by handoff determiner module 144 executing handoff function 146. In one aspect, the NWS BS may operate on a cached copy of WS information 46 from WS information server 48. In another aspect, at 149, based on the execution of handoff determiner module 144, the NWS BS may be triggered by the notification of the need for a handoff to communicate with WS information server 48 to obtain WS information 46. It should be noted that the communication at 149 may occur at any time before or after the determination of the need for the handoff at 143. In some cases, the WS information 46 stored at the NWS BS is periodically updated, for example, based on an update schedule or based on a change in the information at WS information server 48.

At 151, the NWS BS provides to the wireless access terminal identification information for a target base station for use in handing off the communication call. For example, in an aspect, based on execution of handoff determiner module 144, the NWS BS transmits handoff information 148 to AT 12. In other words, handoff determiner module 144 executes handoff function 146 to generate handoff information 148 based on the base stations identified at 147. Handoff information 148 may include any information utilized by AT 12 to establish a connection with a new BS, such as WS BS 20 or even a NWS BS, and to handoff the WS communication session 141 to the new BS. For instance, handoff information 148 may include, but is not limited to, BS identification (ID) information 108 or 116, BS services information 110 or 118, such as, but not limited to, BS service types, e.g. voice, data, etc., BS operating frequency information, service codes or keys for establishing a connection with the BS, service factors such as one or more link quality parameters, such as bandwidth or throughput/goodput, latency, jitter, packet error rates, service cost, etc., and any other parameters for identifying, contacting and establishing a connection with the BS and defining available services. Further, handoff information 148 may include WS BS sector information, which may be included in WS BS service 110 information, as described above.

In some aspects, handoff information 148 may relate to any base stations having a service area corresponding to the location of AT 12. In other aspects, handoff information 148 may relate to any base stations having a service area corresponding to the location of AT 12 and further having compatible or desirable capabilities and/or services for use servicing communications for AT 12. For example, handoff determiner module 144 and/or handoff function 146 may further analyze WS BS services 110 and NWS BS services 118 such as link quality or service cost, and select only certain ones of the possible base stations or sectors able to service AT 12 based on these factors. For instance, such a selection may include choosing a WS BS or sector because of a lower cost of service, e.g. relative to an NWS BS, or such a selection may include choosing a NWS BS because of a better link quality. It should be noted, however, that handoff function 146 may include any rules or predetermined thresholds for making such selections, or may receive such rules, thresholds or desired parameters from AT 12. As such, in some case, handoff information 148 may include one or more base stations or sectors selected from among a plurality of eligible base stations or sectors operable to service AT 12 in the location of AT 12.

Further, handoff information 148 may identify a single base station as the target for the handoff, or may include a plurality of possible target base stations. Further, the plurality of possible target base stations may be ordered according to a factor, such as one of WS BS services 110 and NWS BS services 118, so that AT 12 can attempt to handoff the call to one of the plurality of base stations in an ordered fashion, e.g. if a connection to a first one in a list cannot be established, then the next one in the list is attempted.

At 153, in one aspect, AT 12 establishes a connection with the new WS BS or sector, such as WS BS 20, such that the WS communication session is handed off and subsequently serviced by the new WS BS or sector, e.g. WS BS 20. For example, AT 12 may connect to a given base station as directed by NWS BS based on handoff information 148, such as by executing call establishment module 128 (FIG. 9) and call establishment function 130 (FIG. 9). Alternatively, AT 12 may execute service determiner 131 (FIG. 9), which includes logic operable to evaluate potential handoff targets and select a desired target. For instance, in a similar manner as described for one aspect of NWS BS handoff determiner module 144 and handoff function 146, service determiner 131 may include a function that analyzes WS BS services 110 and NWS BS services 118, such as link quality or service cost, and selects only certain ones of the possible base stations or sectors able to service AT 12 based on these factors in combination with user preferences or thresholds or any other rules for selecting among a plurality of candidate target base stations or sectors based on such factors. Based on the one or more selected base stations or sectors, which may be ranked in an order according to how well they meet the user preference, threshold or selection rule, then call establishment module 128 (FIG. 9) can attempt to handoff the call to one of the selected base stations or sectors, for example, making handoffs attempts in the given order until successful.

In an alternative or additional aspect, at 155 and 157, to assist in performing the handoff, the NWS BS provides the currently serving WS BS, such as WS BS 18, and the target WS BS, such as WS BS 20, with all or some portion of the handoff information 148. For example, in this situation, handoff information 148 may further include the WS communication session information 142 in order to allow continuity in maintaining the WS communication session 141.

In an alternative or additional aspect, at 159 and 161, to assist in performing the handoff, the NWS BS establishes a tunnel between the serving and target WS BS's, such as WS BS's 18 and 20, and the NWS BS may additionally buffer packets, all in order to insure the data stream corresponding to WS communication session 141 is maintained until the session can be fully handed off to WS BS 20. For example, the NWS BS may include a tunneling module 150 having a tunnel generator 152 operable to establish the communication tunnels at 159 and 161.

In yet another alternative or additional aspect, at 163, and as discussed above with regard to handing off the call to a NWS BS, the NWS BS may be the target BS and may convert the WS communication session 141 to an NWS communication session. For example, this case may correspond to the scenario described in FIG. 13. For instance, the NWS BS may include a call establishment module 154 having a communication session generator 156 operable to convert the WS communication session into the NWS communication session.

In this case, the NWS BS may maintain the NWS communication session according to handoff rules and AT mobility. For example, NWS BS may maintain the NWS communication session until AT 12 reaches a new WS service area, e.g. if the NWS BS service area and the NWS BS service area overlap. Further, for example, NWS BS may maintain the NWS communication session until AT 12 reaches a new NWS service area, e.g. if the AT is moving out of a serving NWS BS cell, then the AT may be handed off to a new NWS BS having a stronger signal, such as is associated with a new NWS cell the AT is entering. There may be any number of NWS to WS or NWS to NWS handoffs, depending on the mobility of the AT.

Moreover, when an NWS BS determines to handoff the AT back to a WS BS, the NWS BS may implement dynamic service portioning, as described above, such that the NWS BS determines to transfer all or only some portion of the supported services to the target WS BS, while some portion of the supported services or a low data rate connection may be maintained at the NWS BS.

For example, handoff determiner module 144 may execute handoff function 146 to periodically obtain updates on AT location information 124 and to re-evaluate handoff information 148. For example, at 165 and 167, upon AT 12 reaching a WS service area, such as WS service area 16, the NWS BS may execute handoff determiner module 144 to notify AT 12 and the target WS BS 20 of the handoff and the handoff information 148, thereby enabling the handoff and the WS communication session at 153.

In other words, it is possible that the AT is handed off to the non-whitespace-base station itself, so its whitespace WWAN data traffic is moved to the NWS BS spectrum and infrastructure resources. This may occur if there is no whitespace base-station that can serve the AT. For example, this may happen at cell edges, or due to possible coverage limitations of the whitespace base-station, e.g. if it has limited power. Subsequently as the AT continues to move, the AT may move to a whitespace base-station service area again, if available. The choice as to whether to drop the AT's whitespace communication session (in the absence of another whitespace base station) or whether to continue the AT's session in the licensed non-whitespace spectrum can be left to the infrastructure providers, based on subscription policies, their current system loads, etc.

Additionally, as previously noted, the handoff may include a "softer" handoff, which is a handoff between sectors of the same WS BS, which typical involves a change in WS frequency.

Further, these inter-frequency softer handoffs may need to take into account the allowable for compatible WS spectrum available to the respective AT, as well as the WS spectrum available to the WS BS or sector. For example, different whitespace WWAN clients, e.g. different AT's, may have different permitted WS frequency bands for usage at their respective locations. For instance, an AT may detect another whitespace transmission (for example, a short range peer-to-peer (P2P) transmission in its neighborhood, or a microphone) that a WS BS may not be aware of. In other words, such WS interference detected by a respective AT within an allowable WS frequency band may be identified as an incompatible WS frequency band for the respective AT. As such, different AT's may have different constraints on their respective WS communication ability, which can be addressed by the respective WS BS.

Figure 17:
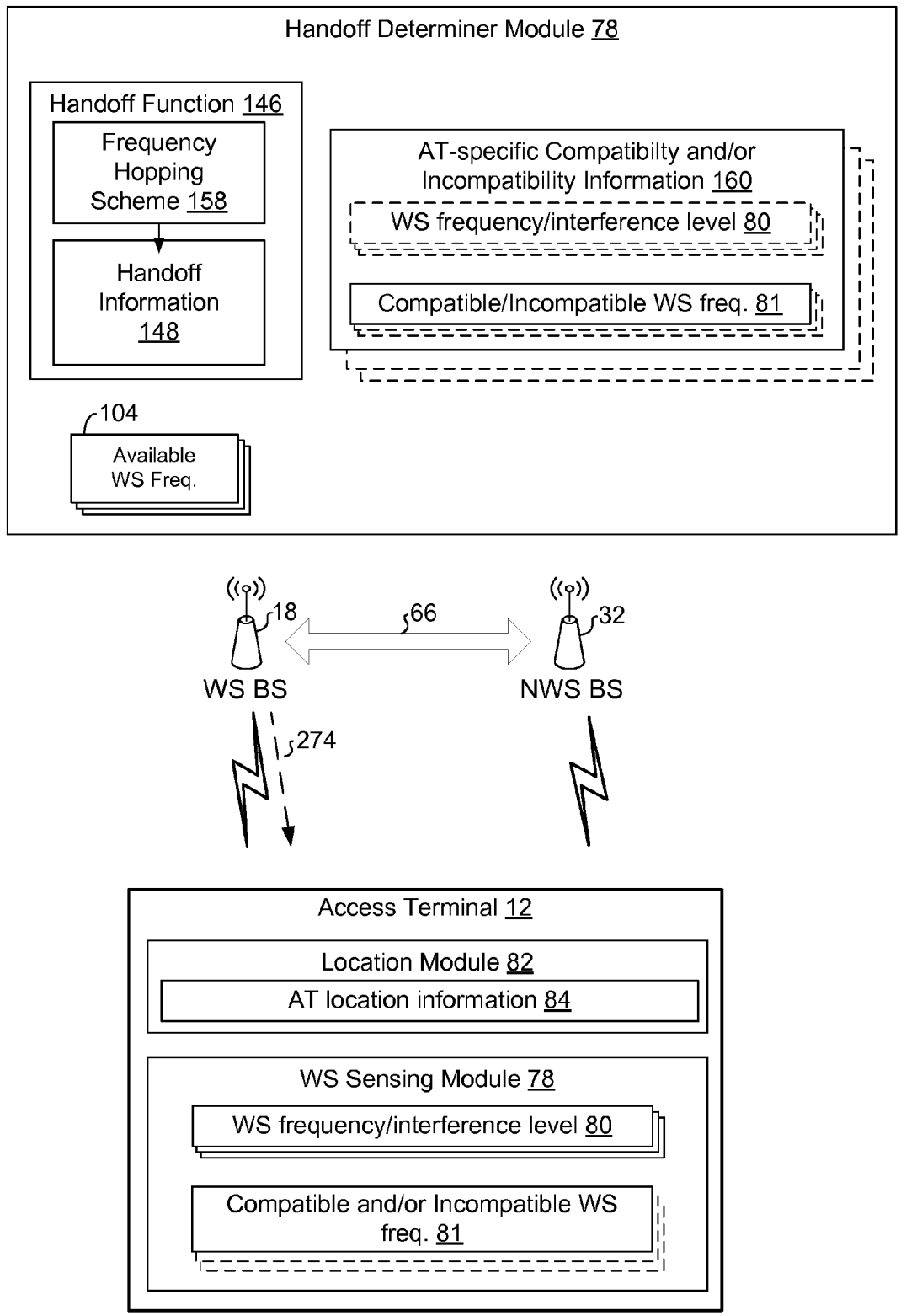
FIG. 17 is a schematic diagram of an aspect of logical components involved in an inter-frequency handoff relating to the flows of FIGS. 14 and 15.

For example, referring to FIG. 17, WS sensing module 78 identifies WS interference levels 80 for one or more of the available WS frequencies 104 associated with a given WS BS. Further, WS sensing module 78 may include logic for generating compatible and/or incompatible WS frequencies 81, from among the available WS frequencies 104, based on the identifies WS interference levels 80. For instance, if a respective interference level 80 for a given WS frequency exceeds a threshold, then that WS frequency may be identified as an incompatible frequency, or that WS frequency may be excluded from a list of compatible WS frequencies.

Further, based on these identified AT WS communication constraints, an AT may have to communicate using a NWS WWAN infrastructure, e.g. NWS BS, or the WS BS, to negotiate appropriate frequency band(s) of communication with the WS BS. Different AT's may determine different compatible WS frequency bands, and the WS BS may have to support each of these different AT's at those different frequency bands. As such, referring to FIG. 17, the WS BS may adopt a frequency hopping scheme 158, e.g. as part of handoff function 146, across the available bands 104 while communicating with the AT's being supported. In the described aspects, the frequency hopping scheme 158 used by the WS BS will take into account the compatible or incompatible bands 81 (or, indirectly, the WS interference levels 80) for each AT being serviced, where this compatible and/or incompatible set of frequency bands can vary for each AT. This information may be referred to at AT-specific compatibility and/or incompatibility information 160. In other words, the WS BS receives any compatible and/or incompatible WS frequency bands for the respective AT's being serviced by the WS BS, and when re-assigning a frequency in the frequency hopping scheme 158, removes the identified incompatible WS frequency bands for the respective AT from consideration as a potential new frequency for the respective AT. Thus, based on the location information 84 of the AT's being serviced, and their respective WS communication constraints, e.g. AT-specific compatibility and/or incompatibility information 160, the WS BS can modify its frequency hopping scheme 158 in a given direction in order to handoff AT's to compatible, available WS frequencies. Further, although discussed primarily with regard to WS BS, it should be noted that NWS BS may also have the ability to perform the same functionality using the above-defined information and mechanisms.

Additionally, in some aspects, the anchor for the handoff may be could be at any level of the wireless infrastructure, such as at the base station/NodeB/eNodeB, RNC, SGSN, GGSN or external to the WWAN networks. For example, any entity in communication with both the WS network 11 and the NWS network 13 may act as the anchor, and insure a continuity of communication during the handoff. For example, as discussed above, tunnel 66 (FIG. 2) may be created at any hierarchical level of the network architecture, and as such may be utilized for this purpose.

Further, in a UMTS technology-based system, movement of client/AT data to keep a session alive, e.g. a handoff of IP traffic or data packets, may happen at any hierarchical level, e.g. at the NodeB, at the RNC, at the SGSN or at the GGSN. Also, in LTE technology-based systems, IP traffic can be carried by eNodeB's, so eNodeB's can tunnel IP traffic between each other. So, direct IP or client data tunneling, e.g. tunnel 66 (FIG. 2), between base stations is optional during handoff. Such tunneling may be used if the infrastructures support it, however, the tunneling could be performed at a higher architectural level.

Figure 18:
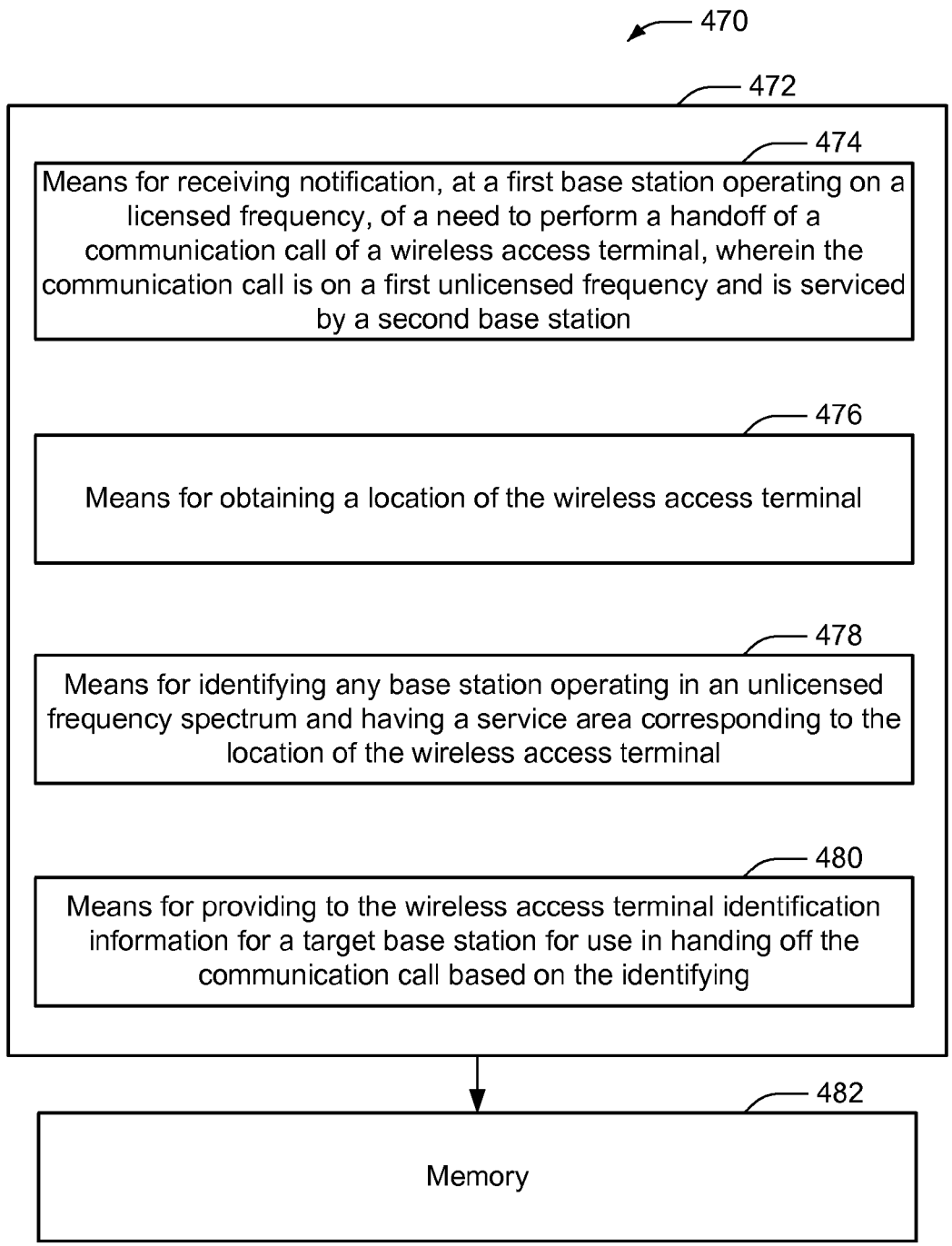
FIG. 18 is a schematic diagram of an aspect of a system of logical components for performing an inter-frequency handoff of a whitespace call.

Referring to FIG. 18, illustrated is a system 470 for facilitating NWS BS assistance to an AT to handoff a WS communication call. For example, system 470 can at least partially reside within a base station, an access point, etc. It is to be appreciated that system 470 is represented as including functional blocks, which can be functional blocks that represent functions implemented by a processor, software, or combination thereof (e.g., firmware).

System 470 includes a logical grouping 472 of means that can act in conjunction. For instance, logical grouping 472 can include means for receiving notification, at a first base station operating on a licensed frequency, of a need to perform a handoff of a communication call of a wireless access terminal, wherein the communication call is on a first unlicensed frequency and is serviced by a second base station (Block 474). Also, logical grouping 472 can include means for obtaining a location of the wireless access terminal (Block 476). Further, logical grouping 472 can include means for identifying any base station operating in an unlicensed frequency spectrum and having a service area corresponding to the location of the wireless access terminal (Block 478). Additionally, logical grouping 472 can include means for providing to the wireless access terminal identification information for a target base station for use in handing off the communication call based on the identifying (Block 480). Moreover, system 470 can include a memory 482 that retains instructions for executing functions associated with the means 474, 476, 478 and 480. While shown as being external to memory 482, it is to be understood that one or more of the means 474, 476, 478 and 480 can exist within memory 482.

Thus, in this aspect, the described apparatus and methods are operable to exchange communication session information to perform handoffs of whitespace communication calls between whitespace base stations (WS BS's) with the assistance of a non-whitespace base stations (NWS BS), or handoffs between a WS BS and a NWS BS.

Caching of WS Information

Referring to FIGS. 19-22, in a further aspect, the described apparatus and methods are operable to cache whitespace information at one or more levels of a NWS network infrastructure.

Figure 19:
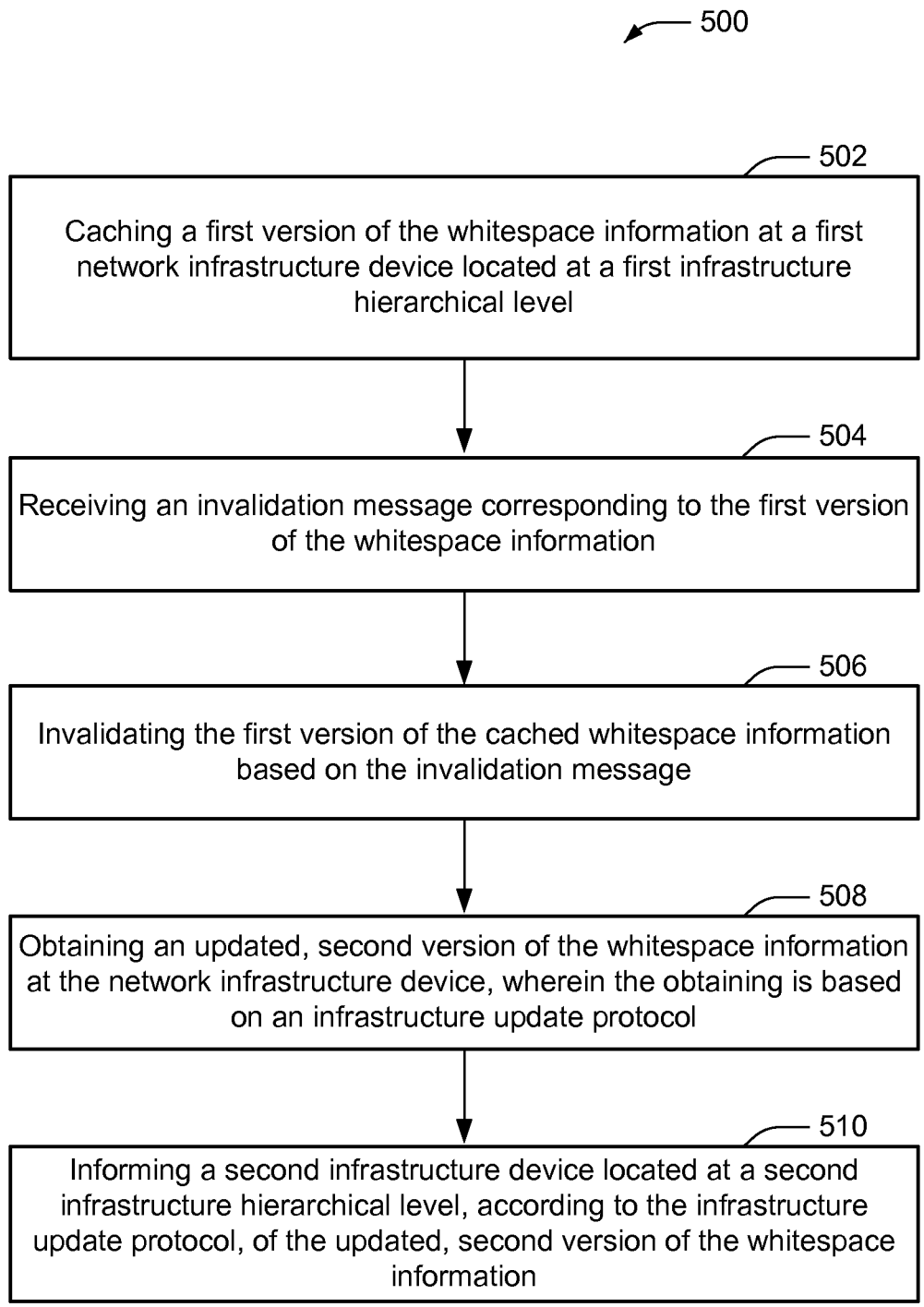
FIG. 19 is a flowchart of an aspect of a method of caching whitespace information.

Referring to FIG. 19, in an aspect, a method 500 of obtaining whitespace information comprises caching a first version of the whitespace information at a first network infrastructure device located at a first infrastructure hierarchical level (Block 502). For example, a network component may include a database of whitespace information.

The method further includes receiving an invalidation message corresponding to the first version of the whitespace information (Block 504). For example, a NWS BS, a WS BS or any other monitoring component may identify a change in the whitespace information, e.g. a new microphone in use in the WS band or a WS BS newly transmitting or no longer transmitting, and forward this change information to the network database.

Also, the method includes invalidating the first version of the cached whitespace information based on the invalidation message (Block 506). For example, the network database operates to update at least a portion of the stored WS information based on the received change information.

Further, the method includes obtaining an updated, second version of the whitespace information at the network infrastructure device, wherein the obtaining is based on an infrastructure update protocol (Block 508). For example, the network database updates and stores the new version of the whitespace information after making the change.

Additionally, the method includes informing a second infrastructure device located at a second infrastructure hierarchical level, according to the infrastructure update protocol, of the updated, second version of the whitespace information (Block 510). For example, the network database forwards at least the changed portion of the whitespace information to another network component, such as a NWS BS, a WS BS, etc.

Figure 20:
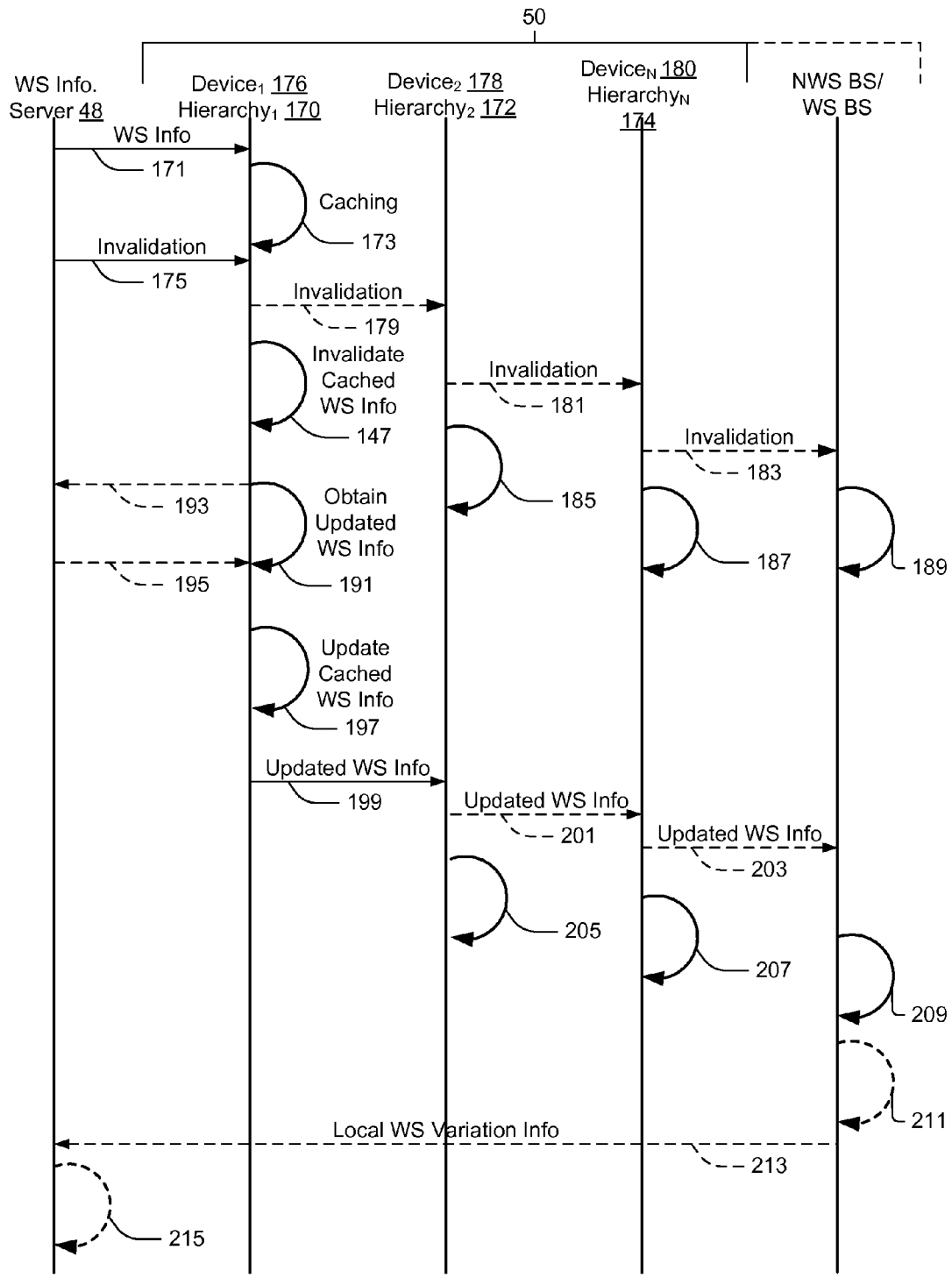
FIG. 20 is a message flow diagram relating to an aspect of caching whitespace information.
Figure 21:
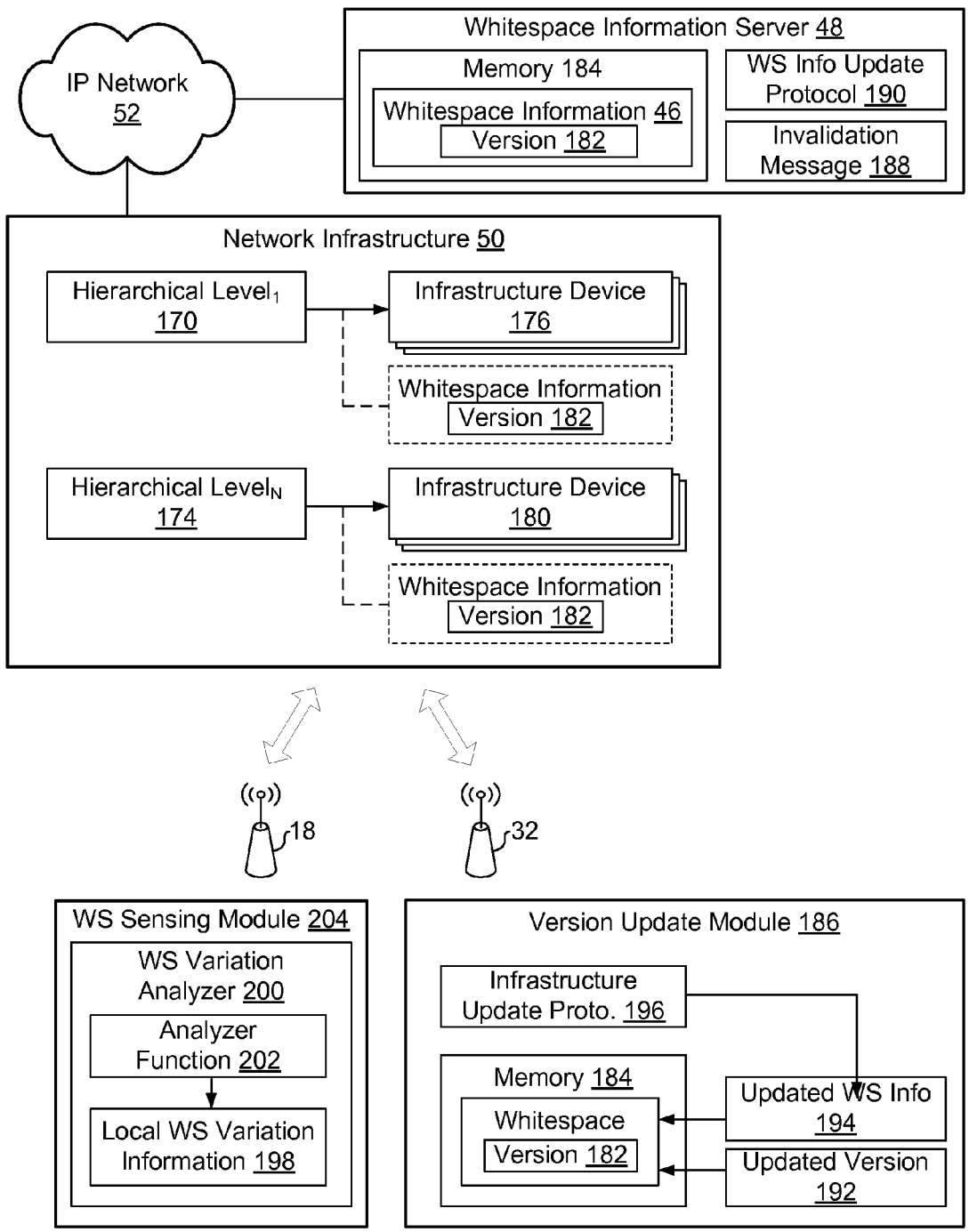
FIG. 21 is a schematic diagram of an aspect of the components of FIG. 1 operable in the flows of FIGS. 19 and 20.

Referring to FIGS. 20 and 21, in a more specific aspect, for instance, at 171, a first network infrastructure device located at a first infrastructure hierarchical level may obtain a first version of the whitespace information. For example, the network infrastructure 50 may include a plurality of hierarchical levels, such as levels 170, 172 and 174, which include one or more infrastructure devices, such as devices 176, 178 and 180. In this example, the plurality of hierarchical levels include n levels, where n is a positive number. Optionally, in some aspects, the NWS BS and/or the WS BS may be considered a part of the network infrastructure 50. For instance, the hierarchical levels 170, 172 and 174 may be based on a node structure extending from WS information server 48 to the NWS BS and/or the WS BS, such as NWS BS 32 and/or WS BS 18, wherein the WS information server 48 is considered the highest level and the NWS BS and/or the WS BS is consider the lowest node. It should be understood, however, that other hierarchical structures may be utilized.

In any case, the obtained WS information 46 has a corresponding version 182, such as an identifier or value. The version 182 may be used to identify a state of the corresponding WS information 46, such as whether or not the information is the latest information.

Further, the obtaining of the WS information 46 may be based on any number of circumstances, such as based on a request received by a BS to establish a WS communication session, a scheduled or periodic update, or any other mechanism to trigger obtaining WS information 46 from WS information server 48.

Additionally, the obtaining may performed by any infrastructure device 176, 178 and 180, optionally including an NWS BS and/or a WS BS, such as NWS BS 32 and/or WS BS 18, at any hierarchical level 170, 172 and 174. In FIGS. 20 and 21, for ease of illustration, the obtaining at 171 is performed by a first infrastructure device 176 at a first hierarchical level 170.

At 173, the respective infrastructure device, such as the first infrastructure device 176 at a first hierarchical level 170, caches the version 182 of the whitespace information 46. For example, network infrastructure 50, or one or more infrastructure devices 176, 178 and 180 and/or BS's 32 and 18, may include a memory 184 operable to store the version 182 of the whitespace information 46. Additionally, it should be noted that whitespace information server 48 likewise includes a memory 186 operable to store the version 182 of the whitespace information 46. Moreover, it should be noted that memory 184 may be a part of or in communication with a version update module 186, which may be included in whitespace information server 48, one or more infrastructure device 176, 178 and 180, as well as one or more NWS BS and WS BS, such as NWS BS 32 and WS BS 18.

At 175, one or more infrastructure devices, such as the first infrastructure device 176 at a first hierarchical level 170, receives an invalidation message 188 corresponding to the first version 182 of the whitespace information 46. For example, WS information server 48, based on execution of a WS information update protocol 190, may generate and transmit the invalidation message 188 to one or more infrastructure devices. In one aspect, for example, the invalidation message 188 may merely indicate that WS information server 48 has an updated version 192 of the WS information 46 with updated WS information 194. Such a "change indication" may then leave it up to the respective infrastructure device to obtain the updated version 192 with the updated WS information 194. In another aspect, for example, the invalidation message 188 may include the updated version 192 with the updated WS information 194.

At 177, one or more infrastructure devices, such as the first infrastructure device 176 at a first hierarchical level 170, invalidates the first version 182 of the cached whitespace information 46 based on the invalidation message 188. For example, the version update module 186 executed by the respective infrastructure device may include an infrastructure update protocol 196 executable to prevent usage of the resident version 182 of the WS information 46, such as but not limited to, by marking or otherwise identifying the resident version 182 of the WS information 46 as being not for use, or by erasing the information.

In some optional aspects, at 179, 181 and 183, respective infrastructure devices, such as device 176, 178, 180 and 32 or 18, successively notify one another of the invalidation message 188, according to the infrastructure update protocol 196. For example, a higher level infrastructure device may notify an adjacent, lower level infrastructure device, and so on, until all devices in the hierarchical structure are notified. Correspondingly, at 185, 187 and 189, these respective infrastructure devices may invalidate their respective version 182 of the cached whitespace information 46 based on the invalidation message.

Additionally, at 191, one or more infrastructure devices, such as the first infrastructure device 176 at a first hierarchical level 170, obtains an updated, second version of the whitespace information, e.g. updated WS information 194 corresponding to updated version 192. In one aspect, the obtaining of the updated, second version of the whitespace information is based on the WS information update protocol 190, which may have dictated that WS information server 48 include updated WS information 194 corresponding to updated version 192 in the invalidation message 188, thereby triggering the version update module 186 of the respective infrastructure device to parse the updated information from the message. In another aspect, the infrastructure update protocol 196 may have dictated that the invalidation message 188 be a "change indication," thereby triggering the version update module 186 of the respective infrastructure device to transmit and messages at 193 and 195 to request and receive the updated WS information 194 corresponding to updated version 192.

It should be noted that in FIGS. 20 and 21, for the sake of clarity, respective obtaining by infrastructure devices 178, 180 and 32 or 18 has not been illustrated, but may be performed by these devices in a similar manner as described for device 176 at 191 or 193 and 195. The actual obtaining process, as noted above, is dictated based on the infrastructure update protocol 196 being executed.

At 197, one or more infrastructure devices, such as the first infrastructure device 176 at a first hierarchical level 170, updates caches the updated WS information 194 corresponding to updated version 192. For example, the devices may execute the version update module 186 to store the update information.

At 199, one or more infrastructure devices, such as the first infrastructure device 176 at a first hierarchical level 170, informs a second infrastructure device located at a second infrastructure hierarchical level, according to the infrastructure update protocol, of the updated, second version of the whitespace information. For example, in FIGS. 20 and 21, device 176 informs device 178 at hierarchical level 172, however, other implementations may be possible depending on the given infrastructure update protocol 196.

In a similar manner, based on the infrastructure update protocol 196, subsequent update messages 201 and 203 may be transmitted to different devices 180 and 32 and/or 18, thereby enabling corresponding updating of cached WS information at 205, 207 and 209.

In such an aspect, the apparatus and methods described efficiently enable the entirety of network infrastructure 50 to be updated with the most current WS information 46 in a manner that is very efficient. For example, by structuring the update protocol 196 to allow one infrastructure device notify and update a neighboring infrastructure device, vast amounts of system overhead and processing resources of WS information server 48 are saved relative to each infrastructure device having cached WS information 46 exchanging individual communications over the network with WS information server 48.

Optionally, at 211 and 213, the apparatus and methods may further include NWS BS and/or WS BS monitoring for changes in local WS information and informing WS information server 48 of relevant local WS variation information 198. For example, WS sensing module 78 of NWS BS and/or WS BS may further include a WS variation analyzer 200 having an analyzer function 202 operable to generate local WS variation information 198. For example, analyzer function 202 may include algorithms, heuristics, neural networks, artificial intelligence, and any other mechanisms suitable for analyzing sensed WS information to determine local WS variation information 198. For example, analyzer function 202 may identify differences in WS transmissions, such as new transmissions or the absence of previously known transmission, over time in a geographic area that persist long enough such that they may be deemed desirable to take into account when establishing ad hoc WS communication sessions. As such, WS sensing module 78 may be executable to initiate transmitting the determined local WS variation information 198 at 213.

Correspondingly, at 215, WS information server 48 may receive the determined local WS variation information 198, analyze them, and, if deemed appropriate, generate updated version 192 with updated WS information 194, thereby triggering the actions beginning, for example, at 171.

Figure 22:
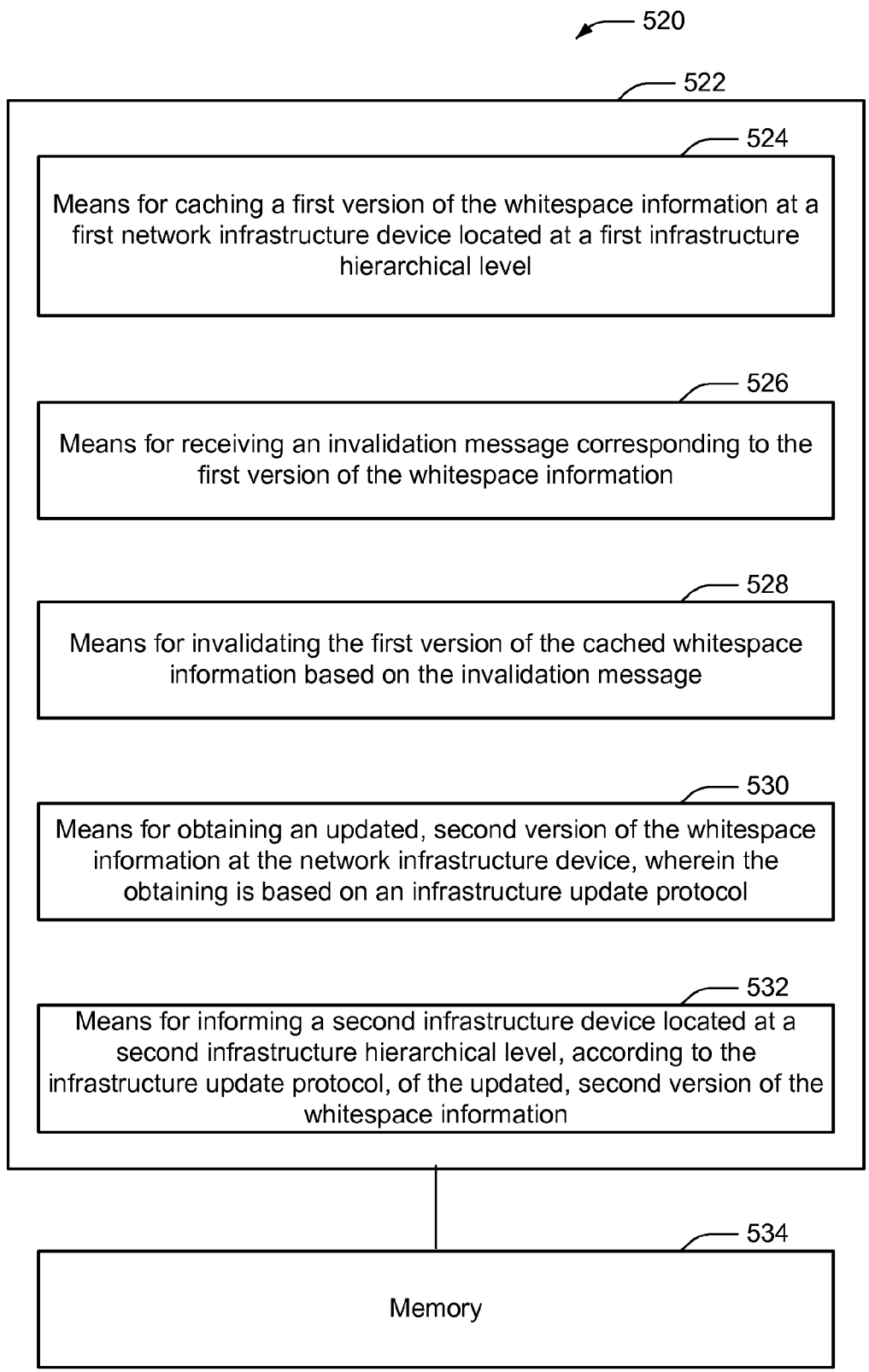
FIG. 22 is a schematic diagram of an aspect of a system of logical components for caching whitespace information.

Referring to FIG. 22, illustrated is a system 520 for facilitating cache whitespace information at one or more levels of a NWS network infrastructure. For example, system 520 can at least partially reside within a base station, an access point, etc. It is to be appreciated that system 520 is represented as including functional blocks, which can be functional blocks that represent functions implemented by a processor, software, or combination thereof (e.g., firmware).

System 520 includes a logical grouping 522 of means that can act in conjunction. For instance, logical grouping 522 can include means for caching a first version of the whitespace information at a first network infrastructure device located at a first infrastructure hierarchical level (Block 524). Further, logical grouping 522 can include means for receiving an invalidation message corresponding to the first version of the whitespace information (Block 526). Also, logical grouping 522 can include means for invalidating the first version of the cached whitespace information based on the invalidation message (Block 528). Further, logical grouping 522 can include means for obtaining an updated, second version of the whitespace information at the network infrastructure device, wherein the obtaining is based on an infrastructure update protocol (Block 530). Additionally, logical grouping 522 can include means for informing a second infrastructure device located at a second infrastructure hierarchical level, according to the infrastructure update protocol, of the updated, second version of the whitespace information (Block 532). Moreover, system 520 can include a memory 534 that retains instructions for executing functions associated with the means 524, 526, 528, 530 and 532. While shown as being external to memory 534, it is to be understood that one or more of the means 524, 526, 528, 530 and 532 can exist within memory 534.

Thus, the cached whitespace information may be maintained and updated at the one or more levels of the network infrastructure according to various mechanisms. Further, this aspect reduces load at the whitespace information server by distributing the whitespace information at one or more levels of the NWS network infrastructure, thereby reducing latency for the delivery of whitespace information to whitespace devices, such as an AT seeking to establish a whitespace communication.

P2P WS Communication

Referring to FIGS. 23-26, in a further aspect, the described apparatus and methods are operable to enable peer-to-peer (P2P) WS communication between two AT's with assistance from one or more NWS BS's or from another network component, such as a network server.

Figure 23:
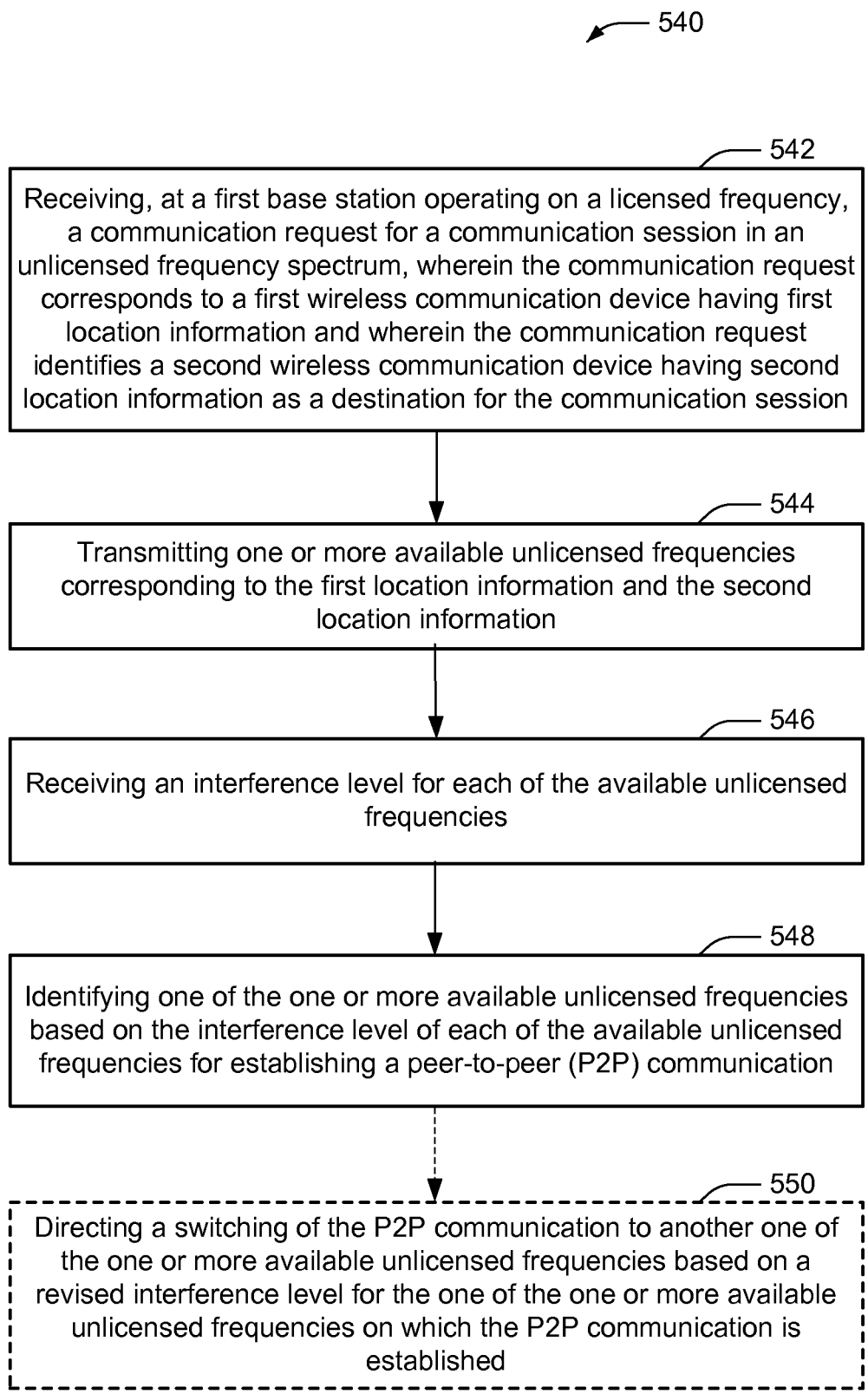
FIG. 23 is a flowchart of an aspect of a method of peer-to-peer (P2P) whitespace communication.

Referring to FIG. 23, in an aspect, a method 540 of establishing peer-to-peer (P2P) communication comprises receiving, at a first base station operating on a licensed frequency, a communication request for a communication session in an unlicensed frequency spectrum, wherein the communication request corresponds to a first wireless communication device having first location information and wherein the communication request identifies a second wireless communication device having second location information as a destination for the communication session (Block 542). For example, a NWS BS may receive, from an AT, a request to initiate a P2P session, or a request to handoff an existing session.

The method further includes transmitting one or more available unlicensed frequencies corresponding to the first location information and the second location information (Block 544). For example, the NWS BS may access a network database or corresponding WS BSs to request and/or access the respective one or more available unlicensed frequencies corresponding to the first location information and the second location information, and then forward these frequencies to the respective AT and the corresponding WS BS or second wireless communication device for testing the frequencies.

Also, the method includes receiving an interference level for each of the available unlicensed frequencies (Block 546). For example, the NWS BS may obtain the respective interference levels for the one or more available unlicensed frequencies, such as by receiving from the first and second wireless communication devices, or peer devices, or from the WS BS, interference measurements corresponding to the available unlicensed frequencies, or otherwise the NWS BS may obtain the interference levels based on measurements by other devices in the vicinity of the peer devices or in the vicinity of the WS BS. Optionally, along with the interference levels, the NWS BS may receive identification of a preferred frequency or a ranking of preferred frequencies from the devices or from the WS BS.

Moreover, the method includes identifying one of the one or more available unlicensed frequencies based on the interference level of each of the available unlicensed frequencies for establishing a peer-to-peer (P2P) communication between the first wireless device and the second wireless communication device (Block 548). For example, the NWS BS may determine that one of the available unlicensed frequencies has a sufficiently low amount of interference for both peer devices to enable establishment of a peer communication session, or the NWS BS may identify one of the available unlicensed frequencies having a lowest interference level, and may provide information to the peer devices with the information for establishing communication on the identified available unlicensed frequency. Optionally, in some aspects, the NWS BS may identify the available unlicensed frequency based on received preference or ranking information, as mentioned above, or the NWS BS may provide one or both peers with frequency options and allow the peers to determine the selected available unlicensed frequency for use in the peer-to-peer communication.

Optionally, the method includes directing a switching of the P2P communication to another one of the one or more available unlicensed frequencies based on a revised interference level for the one of the one or more available unlicensed frequencies on which the P2P communication is established (Block 550). For example, the NWS BS may receive an update on the respective interference levels and determine a new available unlicensed frequency having a more suitable interference level than the previously assigned unlicensed frequency.

In other words, the described aspects enable an AT, via either WS or NWS, to connect to the network. Subsequently, the AT can form a P2P link with another nearby peer over WS with assistance from the network.

Figure 24:
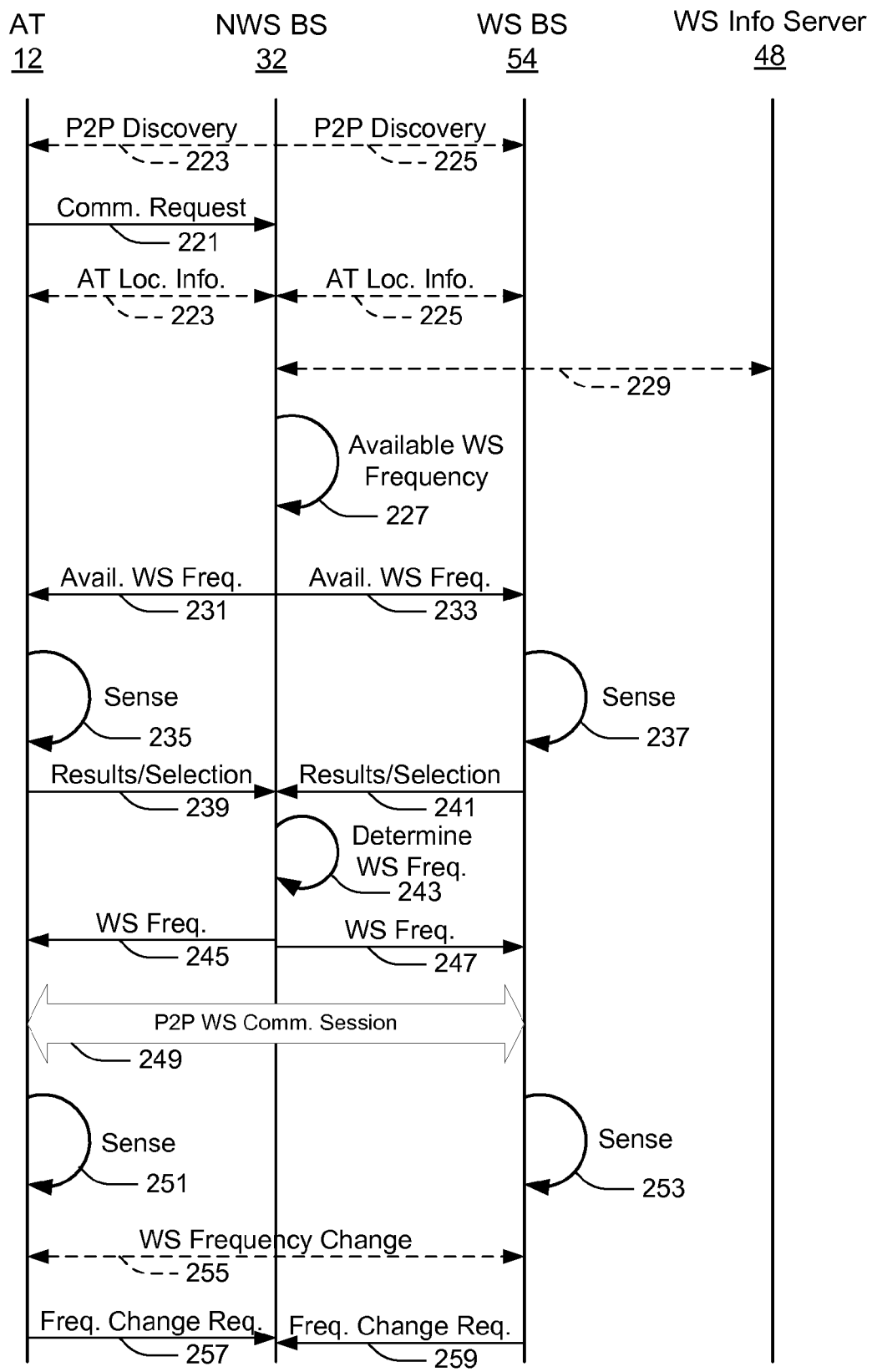
FIG. 24 is a message flow diagram relating to an aspect of peer-to-peer (P2P) whitespace communication.
Figure 25:
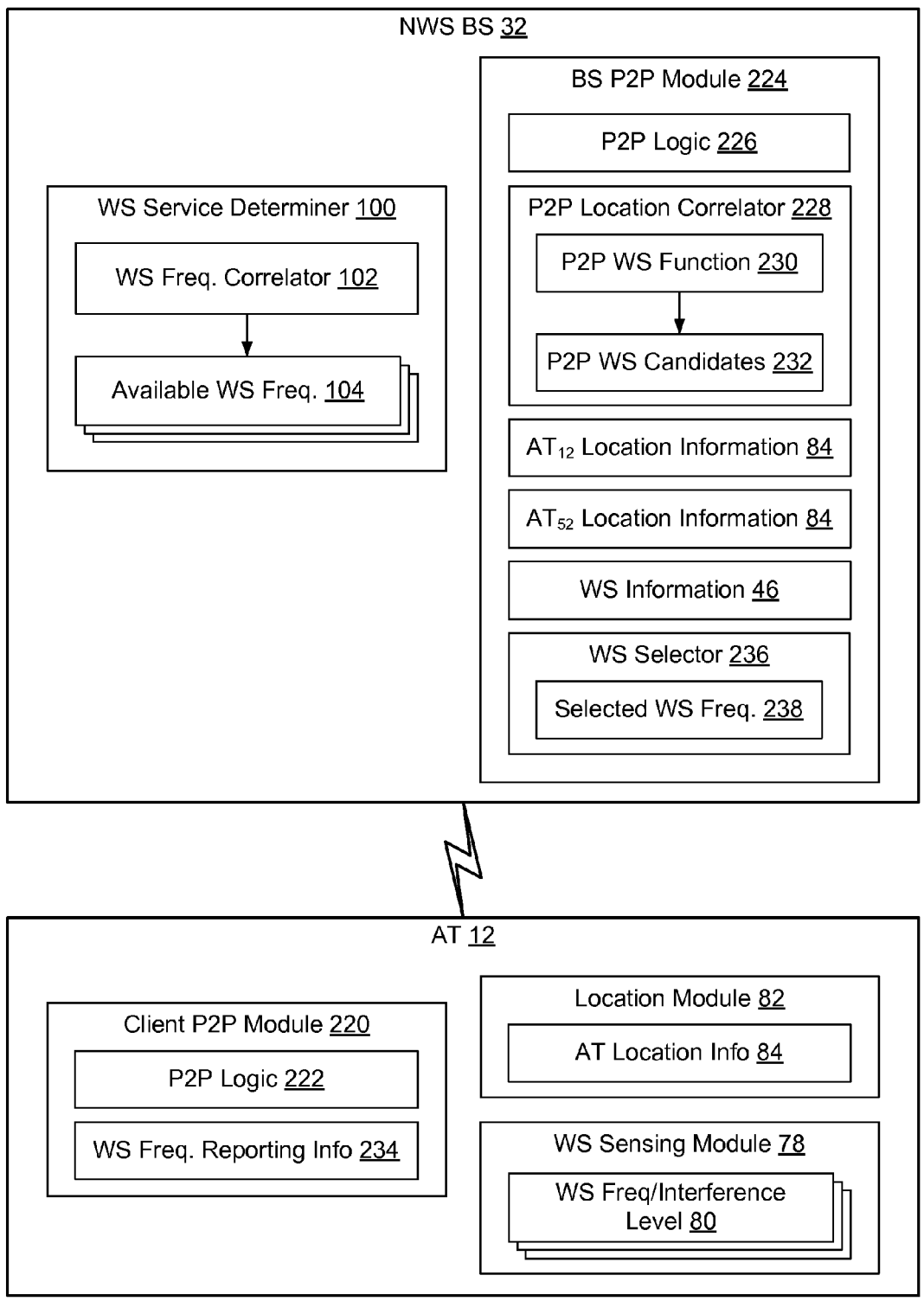
FIG. 25 is a schematic diagram of an aspect of a non-whitespace base station and access terminal of FIG. 1 operable in the flows of FIGS. 23 and 24.

Referring to FIGS. 24 and 25, in a more specific aspect, at 221, a first wireless communication device transmits, to a first base station operating on a licensed frequency, a communication request for a communication session in an unlicensed frequency spectrum. In this case, the first wireless communication device has first location information and the communication request identifies a second wireless communication device having second location information as a destination for the communication session. For instance, referring to FIG. 1, the first wireless communication device may be AT 12, and the second wireless communication device may be AT 52, both having respective AT location information 84 defining their geographic location to be within the same WS service area, such as WS service area 14. Further, for example, the first base station operating on a licensed frequency may be NWS BS 32, which has service area 22 (FIG. 1) within which AT's 12 and 52 are located.

In one optional aspect, it should be noted that the communication request at 221 may include an indication that a peer-to-peer (P2P) WS communication session is desired. For example, each of AT 12 and AT 52 may include a client P2P module 220 having P2P logic 222 executable to enable each device to discover the other and initiate the establishment of a P2P WS communication session. For example, prior to communication request at 221, at 223 and 225, each AT 12 and 52 may perform an exchange via NWW BS 32, which may include BS P2P module 224 having P2P logic 226 executable to assist the AT's in discovering one another and to assist in establishing a P2P WS communication session.

Alternatively, in another aspect, the communication request at 221 may be a general communication request, and NWS BS 32 may operate BS P2P module 224 to execute a P2P location correlator 228 having a P2P WS function 230 executable to generate one or more P2P WS candidates 232, which are AT's operating in the same WS service area and associated with a call. For example, P2P WS function 230 may include rules based on the respective AT location information 84 and WS information 46 in order to identify the P2P WS candidates 232. For example, at 223 and 225, NWS BS 32 may execute BS P2P module 224 to gather the respective AT location information 84 from AT's 12 and 52.

At 227, based on the respective AT location information 84 from AT's 12 and 52, NWS BS 32 determines the available WS frequencies 104. For example, the BS P2P module 224 of the NWS BS 32 may cooperate with the WS service determiner 100, which executes WS frequency correlator 102 to determine the one or more available WS frequencies 104. Further, in some aspects, at 229, prior to determining the available WS frequencies 104, the NWS BS 32 may communicate with WS information server 48 to obtain WS information 46. It should be noted, however, that WS information 46 may be obtained at any time, and may be already cached on NWS BS 32.

At 231 and 233, AT 12 and AT 52 respectively receive the one or more available unlicensed frequencies, e.g. available WS frequencies 104, corresponding to the first location information and the second location information, e.g. the respective AT location information 84.

At 235 and 237, at least one of AT 12 and AT 52 respectively determines an interference level for each of the available unlicensed frequencies. For example, in some aspects, only one of the AT's determines the interference level, while in other aspects both AT's determine the interference level, which may vary from one AT to the other depending on the distance between the locations of the AT's. For instance, each AT 12 and 52 may execute WS sensing module 78 in order to measure the WS frequency and corresponding interference level 80 for each of the available unlicensed frequencies 104.

At 239 and 241, one or both of AT 12 and AT 52 transmit a reporting message to NWS BS 32. For example, the reporting message may include WS frequency reporting information 234, which includes the WS frequency/interference level 80 for each of the available unlicensed frequencies, and optionally may include an AT selected available WS frequency or an AT-specific ranking of WS frequency preferences, for example, according to execution of P2P logic 222 based on the respective WS frequency/interference level 80.

At 243, NWS BS 32 receives the reporting message from one or both AT's and executes WS selector 236 to determine a selected WS frequency 238 for establishment of a WS P2P communication session. For example, in some aspects, WS selector 236 determines the selected WS frequency 238 based on the reported WS frequency/interference level 80 for each of the available unlicensed frequencies from one or both AT's. In other aspects, WS selector 236 considers or matches WS frequency selections or ranked WS frequency preferences in order to determine the selected WS frequency 238.

In any case, at 245 and 247, both AT 12 and AT 52 receive the selected WS frequency 238.

Further, at 249, based on execution of the respective client P2P modules 222, AT 12 and AT 52 establish a P2P WS communication session on the selected WS frequency. As such, the P2P communication is established on one of the one or more available unlicensed frequencies based on the determined interference level of each of the available unlicensed frequencies.

At 251 and 253, one or both of AT's 12 and 52 may sense the selected WS frequency 238 to refresh the value of the interference level 80. For example, one or both AT's 12 and 52 may execute WS sensing module 78, such as based on a schedule or based on a triggering event, such as a degradation in a quality of service parameter of the P2P WS communication session. Further, such sensing may additionally involve sensing each of the available WS frequencies 104 and refreshing the corresponding interference levels 80.

In an optional aspect, at 255, the AT's may agree to switch the P2P communication to another one of the one or more available unlicensed frequencies based on a revised interference level determined for the one of the one or more available unlicensed frequencies on which the P2P communication is established. For example, if the interference level 80 for the selected WS frequency 238 exceeds a threshold, then AT's 12 and 52 may agree to switch to another one of the available WS frequencies 104, such as one having an interference level below the threshold.

Alternatively, at 257 and 259, one or both of AT 12 and AT 52 may send a frequency change request to NWS BS 32, which may manage selection of a new frequency in a similar manner as described at 243, but based on the refreshed interference information and/or AT frequency selections or preferences, all of which may be included in the frequency change request. Accordingly, the AT's may be informed of the new frequency, similar to acts 245 and 247, and thus the P2P WS communication session may be moved to a new WS frequency, as in act 255.

In another aspect, the peers first need to find each other in non-whitespace, so they might find each other on some internet site. Then based on geographic location, they might find that they are within geographic proximity. That is when they negotiate with a whitespace information server to find out a possible whitespace spectrum to communicate over. Such negotiation may take place via non-whitespace base station connecting the peers to the whitespace information server. Subsequently, the peers can proceed to establish communication over the selected whitespace spectrum. It is possible that due to mobility, the peers have to find a new whitespace region to go to, e.g. based on spectrum sensing (such as a microphone is detected or there is some other transmission), or a table lookup available to the peers (based on information from the whitespace server) as they move. In such situations, whitespace frequency renegotiation may occur. Even for initial setup, this renegotiation may occur if some interference is sensed.

It should be noted that is not necessary that both peers are communicating over WWANs. One of the peers could be at home over DSL while the other is using the WWAN to determine the whitespace spectrum to use. Additionally, it is possible that a peer moved from a non-whitespace WWAN to a whitespace WWAN, and then discovered the peer. In that case, the assistance from the infrastructure will come from whitespace WWAN.

Figure 26:
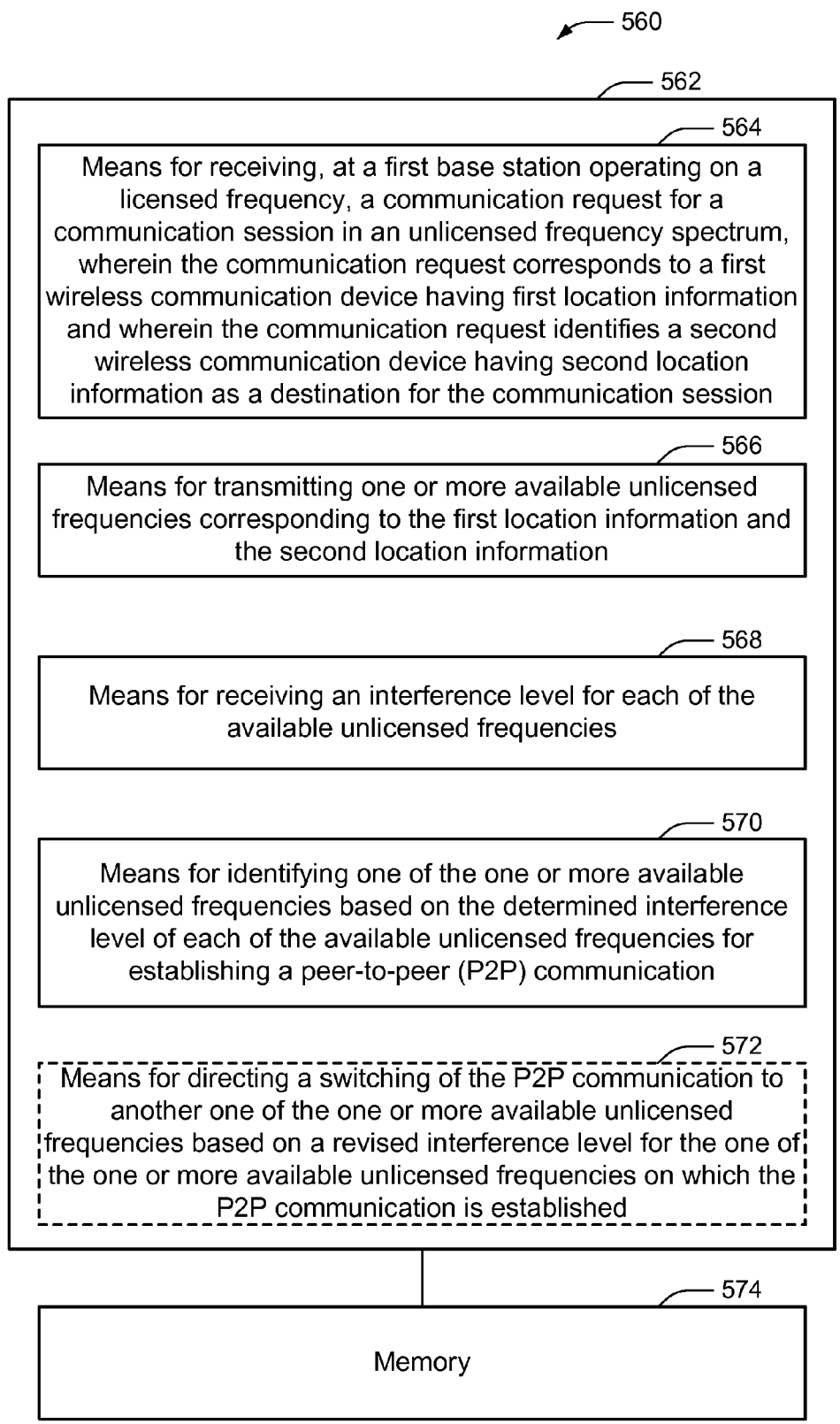
FIG. 26 is a schematic diagram of an aspect of a system of logical components for peer-to-peer (P2P) whitespace communication.

Referring to FIG. 26, illustrated is a system 560 for facilitating peer-to-peer (P2P) WS communication between two AT's with assistance from one or more NWS BS's. For example, system 560 can at least partially reside within a base station, an access point, etc. It is to be appreciated that system 560 is represented as including functional blocks, which can be functional blocks that represent functions implemented by a processor, software, or combination thereof (e.g., firmware).

System 560 includes a logical grouping 562 of means that can act in conjunction. For instance, logical grouping 562 can include means for receiving, at a first base station operating on a licensed frequency, a communication request for a communication session in an unlicensed frequency spectrum, wherein the communication request corresponds to a first wireless communication device having first location information and wherein the communication request identifies a second wireless communication device having second location information as a destination for the communication session (Block 564). The logical grouping 562 can also include means for transmitting one or more available unlicensed frequencies corresponding to the first location information and the second location information (Block 566). Further, the logical grouping 562 can include means for receiving an interference level for each of the available unlicensed frequencies (Block 568). Moreover, the logical grouping 562 can include means for identifying one of the one or more available unlicensed frequencies based on the determined interference level of each of the available unlicensed frequencies for establishing a peer-to-peer (P2P) communication (Block 570). Optionally, the logical grouping 562 can include means for switching the P2P communication to another one of the one or more available unlicensed frequencies based on a revised interference level determined for the one of the one or more available unlicensed frequencies on which the P2P communication is established (Block 572). Moreover, system 520 can include a memory 574 that retains instructions for executing functions associated with the means 564, 566, 568, 570 and 572. While shown as being external to memory 574, it is to be understood that one or more of the means 564, 566, 568, 570 and 572 can exist within memory 574.

Thus, this aspect provides an efficient, scheme for P2P whitespace communication assisted by NWS and/or WS WWANs or another network component, such as a server, e.g. where an AT utilizes the NWS BS-provided whitespace information to consume substantially less energy to find a suitable whitespace frequency than would be consumed if the entire whitespace spectrum were evaluated.

Whitespace Base Station Venue-Specific Broadcasting

Referring to FIGS. 27-30, in another aspect, the described apparatus and methods are operable to allow venue-specific broadcasting of information, referred to as venue-casting, by a whitespace base station. For instance, such venue-specific broadcasting may include advertising, marketing information, general venue information, etc. In one use case, a store having a sale may want to advertise the sale to any devices within the WS service area. In this case, the store may or may not be located in the WS service area, or the store may have a target audience in the WS service area. As such, any device located in the WS service area and receiving the broadcast could access the advertisement of the store sale.

Figure 27:
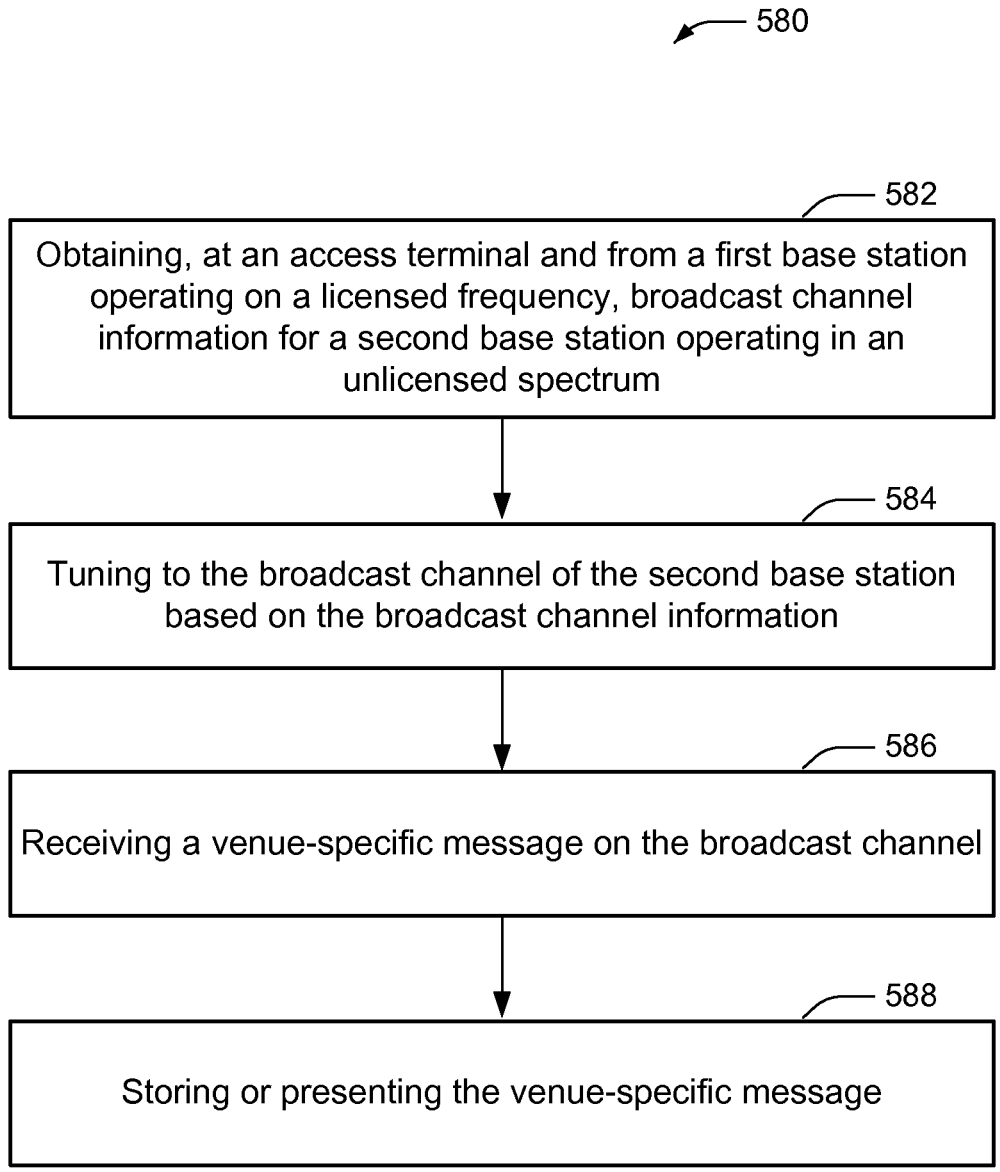
FIG. 27 is a flowchart of an aspect of a method of venue-casting information from a whitespace base station.

Referring to FIG. 27, in an aspect, a method 580 of receiving venue-specific information comprises obtaining, at an access terminal and from a first base station operating on a licensed frequency, broadcast channel information for a second base station operating in an unlicensed spectrum (Block 582). For example, the AT may receive the broadcast channel information in a pilot message from an NWS BS, or based on tuning to a frequency identified in the pilot message.

The method further includes tuning to the broadcast channel of the second base station based on the broadcast channel information (Block 584). For example, the AT may tune a radio or modem on the AT to the broadcast channel identified in the broadcast channel information.

Also, the method includes receiving a venue-specific message on the broadcast channel (Block 586). For example, the AT may receive one or more messages targeted to the specific location or venue in which the AT is positioned.

Additionally, the method includes storing or presenting the venue-specific message (Block 588). For example, the AT may provide the received message to the user via a user interface, such as presenting text or graphics on a display and/or generating audio via a speaker, enabling a user of the AT to receive the venue-specific information.

Figure 28:
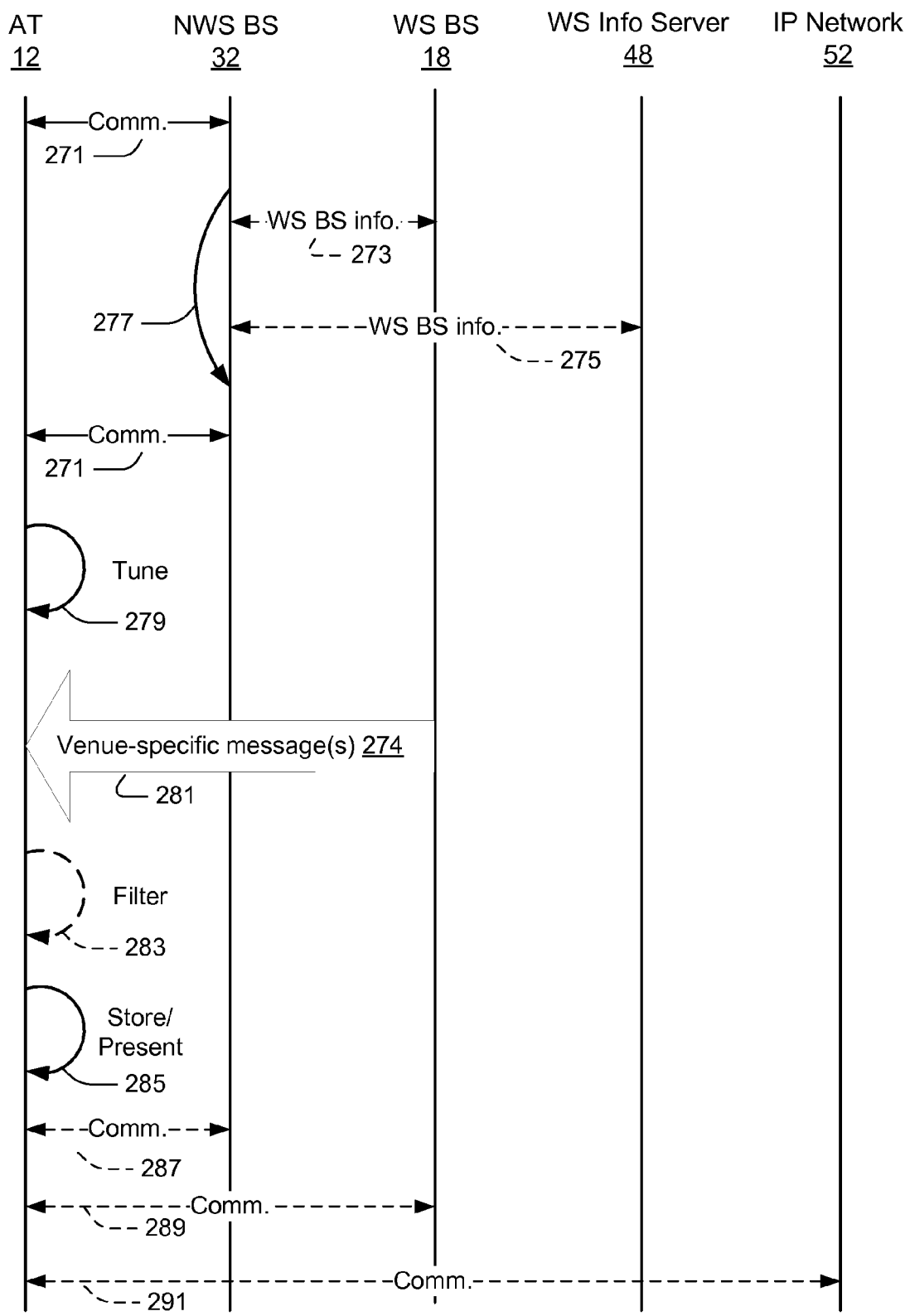
FIG. 28 is a message flow diagram relating to an aspect of venue-casting information from a whitespace base station.
Figure 29:
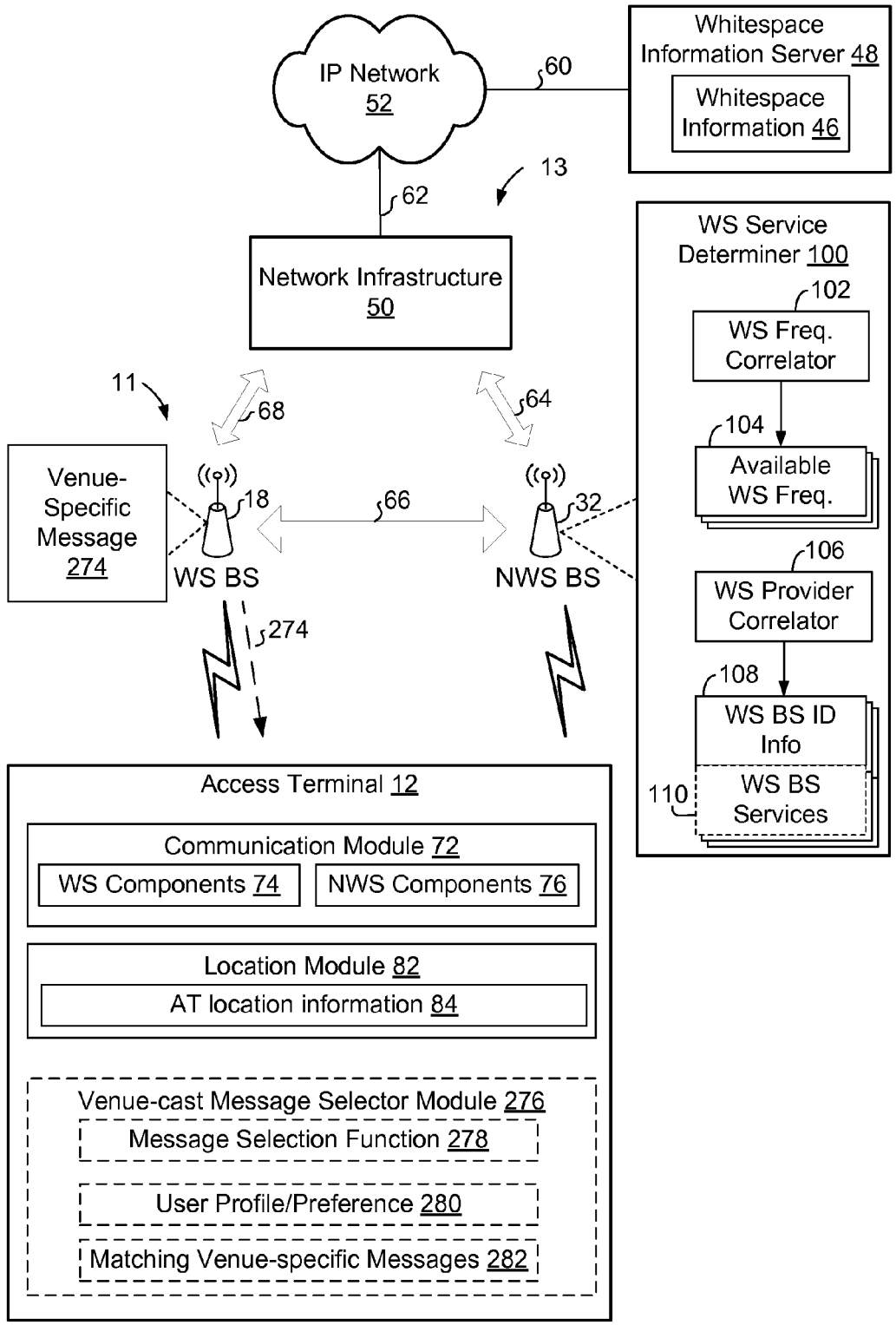
FIG. 29 is a schematic diagram of an aspect of a non-whitespace base station and access terminal of FIG. 1 operable in the flows of FIGS. 27 and 28.

More specifically, referring to FIGS. 28 and 29, for example, at 271, the AT 12 may communicate with the NWS BS 32 and obtain information on WS BS's in the vicinity of the AT. For instance, the AT 12 may be located in the WS service area of one or more WS BS's, such as WS BS 18. The communication may be initiated in any number of manners, including but not limited to occurring upon AT 12 discovering NWS BS 32, or based on a specific request by the AT 12 for WS BS information, or more specifically, WS BS venue-specific broadcast information. As noted above, the information for each WS BS may be defined as WS BS service information 110, which may include WS BS broadcast channel information 272, such as one or more frequencies. As described above, NWS BS 32 may execute WS service determiner 100 at 277 to obtain this WS BS information, such as based on information received at 273 from WS BS's, such as WS BS 18, neighboring NWS BS 32 and/or based on information obtained at 275 from WS information server 148, or to process previously received WS BS information based on the location of AT 12.

Upon receiving the broadcast frequency or channel information, at 279 the AT 12 may tune to one or more broadcast frequency/channel and, at 281, obtain a broadcast of one or more venue-specific messages 274. For example, AT 12 may operate communications module 72 and WS components 74 to tune the AT 12 to receive the broadcast on one or more of the identified frequencies. Further, for example, each venue-specific message 274 may include venue metadata defining the message, such as but not limited to one or more of a name of the venue, a location of a venue, a description of the subject matter of the message, such as key words defining a topic, data identifying a target audience, such as demographic information, receiving device-related information, message data, such as the ad or venue information, links to additional data, telephone numbers, or any other data enabling a device receiving the venue-specific message to determine a level of interest in the contents of the venue-specific message.

Since the WS BS may have a relatively large service area, the broadcast may include many different venue-specific messages for geographically different areas within the WS service area. As such, in some optional aspects, at 283 the AT 12 may filter the one or more venue-specific messages 283 so that the AT 12 only stores and/or presents venue-specific messages relevant to the AT. For example, the AT 12 may include a venue-cast message selector module 276 having a message selection function 278 operable to analyze venue-specific messages 283 and determine whether or not to store and/or present them, or whether or not to discard them, for example, based on an assessed level of interest or applicability determined by analyzing metadata in the message and/or by further taking into account AT-specific or AT-user information.

For instance, in an aspect, the message selection function 278 may filter venue-specific messages 283 may be based on the AT location, such that venue-specific messages 283 corresponding to venues having a predetermined relationship to the AT location are stored. The predetermined relationship to the AT location may include, for example, a distance threshold, e.g. a venue within 5 miles of the current AT location or a predicted future location, e.g. based on AT velocity and direction or historical movements.

In other aspects, the message selection function 278 may identify or present the venue-specific messages to a user of the AT, e.g. via a user interface, so that a selection of venue-specific messages may be received from the user.

In still another aspect, the message selection function 278 may include logic for automatically selecting which venue-specific messages to store and/or present. For example, venue-cast message selector module 276 may include a user profile and/or user preferences 280, e.g. user-entered or automatically determined, e.g. based on historical user interactions, areas of interest to the user, and the AT may then compare metadata defining the venue-specific messages to the user preferences in order to find a match, and then save and/or present the matching venue-specific messages 282.

In any case, at 285, one or more of the venue-specific messages 274, including one or more of the matching venue-specific messages 282, may be stored in a memory or data store, and/or presented on an output mechanism, e.g. one or more of a display or a speaker, for consumption by the user, or may be saved in a data store or memory for selective recall by the user.

Optionally, at 287, 289 and 291, in response to one or more venue-specific messages 274, the AT 12 may respectively communicate with one or more of NWS BS 32, WS BS 18 or IP network 52. For example, venue-specific message 274 may include a hyperlink that a user can use to connect to IP network 52, such as the Internet, to access a web server to obtain additional information, such as product information or such as a mapping server to get a map or directions to or within the venue. Further, for example, venue-specific message 274 may include a phone number, for example, of a store or to an operator who can take an order of an advertised product, and AT 12 may establish a communication call with NWS BS or WS BS having the phone number as the destination. It should be noted that these are but a few of a myriad of possible interactions that may occur based on receiving and interacting with venue-specific message 274.

Figure 30:
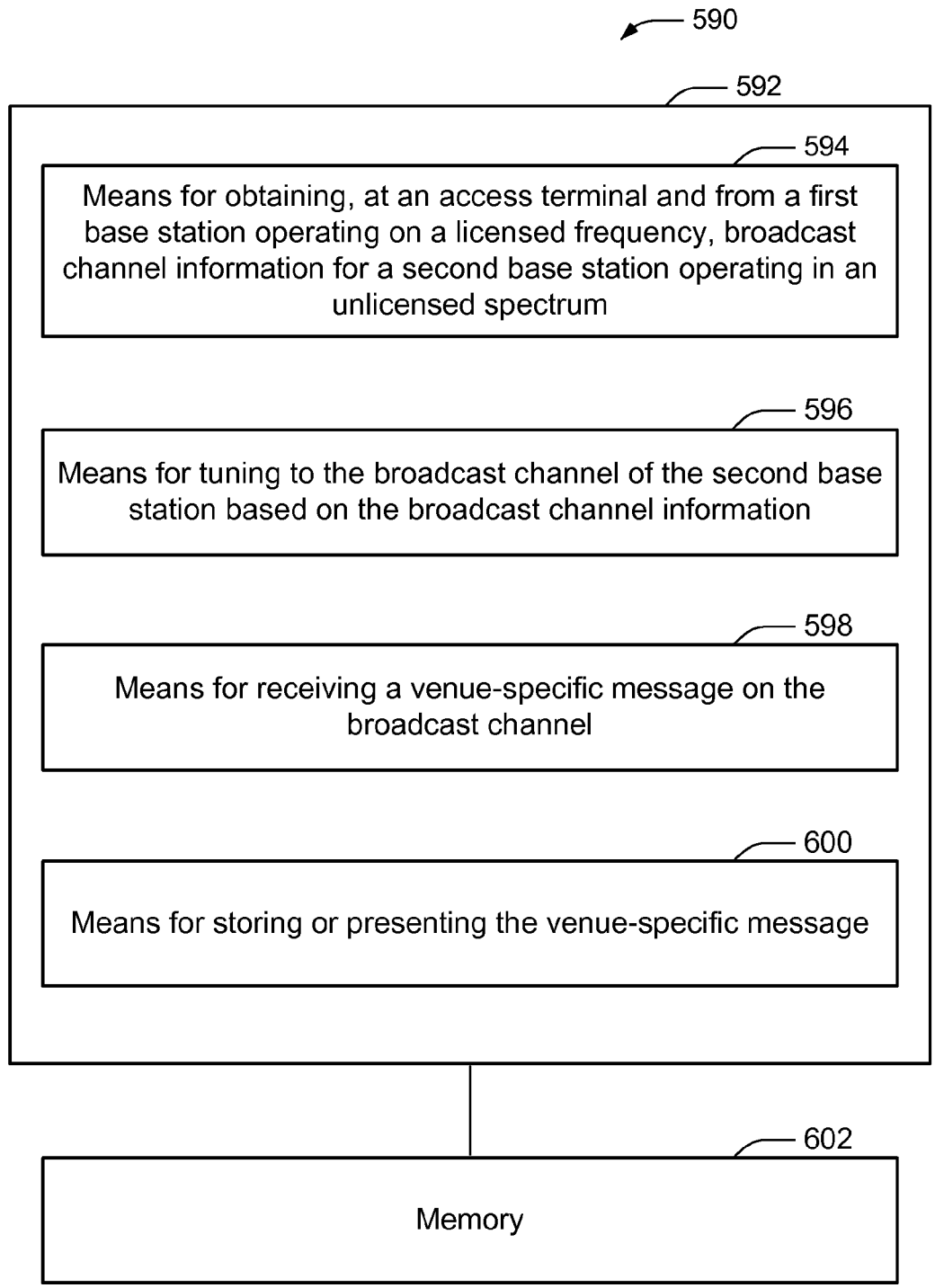
FIG. 30 is a schematic diagram of an aspect of a system of logical components for venue-casting information from a whitespace base station.

Referring to FIG. 30, illustrated is a system 590 for facilitating venue-specific broadcasting of information, referred to as venue-casting. For example, system 590 can at least partially reside within a base station, an access point, etc. It is to be appreciated that system 590 is represented as including functional blocks, which can be functional blocks that represent functions implemented by a processor, software, or combination thereof (e.g., firmware).

System 590 includes a logical grouping 592 of means that can act in conjunction. For instance, logical grouping 592 can include means for obtaining, at an access terminal and from a first base station operating on a licensed frequency, broadcast channel information for a second base station operating in an unlicensed spectrum (Block 594). The logical grouping 592 can also include means for tuning to the broadcast channel of the second base station based on the broadcast channel information (Block 596). Further, logical grouping 592 can include means for receiving a venue-specific message on the broadcast channel (Block 598). Additionally, the logical grouping 592 can include means for storing or presenting the venue-specific message (Block 600). Moreover, system 590 can include a memory 602 that retains instructions for executing functions associated with the means 594, 596, 598 and 600. While shown as being external to memory 602, it is to be understood that one or more of the means 594, 596, 598 and 600 can exist within memory 602.

Thus, in this aspect, the described apparatus and methods are operable to provide venue-casting services.

Figure 31:
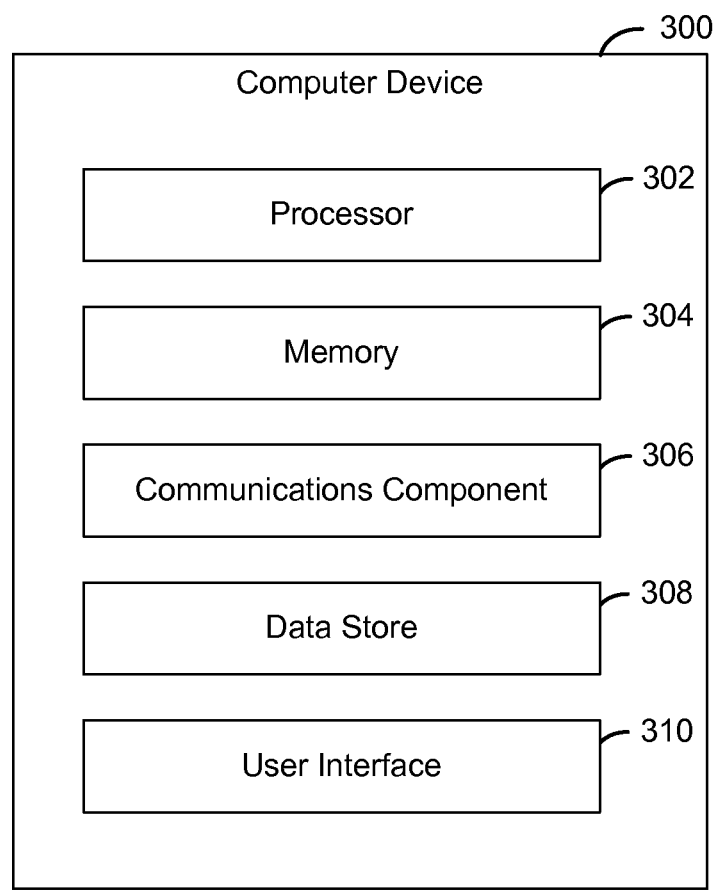
FIG. 31 is a schematic diagram of a computer device operable in the described aspects.

Referring to FIG. 31, in one aspect, any of above-described components, such as AT, NWS BS, WS BS, network infrastructure, WS information server (FIGS. 1 and 2) may be operated as computer device 300. Computer device 300 includes a processor 302 for carrying out processing functions associated with one or more of the methods, components or functions described herein. For example, processor 302 can carry out one or more of dynamic partitioning of network access and/or communication services, assistance in performing a handoff of a call from a WS BS, dynamic caching of WS information, establishing peer-to-peer communications, and WS BS venue-specific broadcasting. Processor 302 can include a single or multiple set of processors or multi-core processors. Moreover, processor 302 can be implemented as an integrated processing system and/or a distributed processing system.

Computer device 300 further includes a memory 304, such as for storing local versions of applications, codes, instructions or modules being executed by processor 302. Memory 304 can include any type of memory usable by a computer, such as random access memory (RAM), read only memory (ROM), tapes, magnetic discs, optical discs, volatile memory, non-volatile memory, and any combination thereof.

Further, computer device 300 includes a communications component 306 that provides for establishing and maintaining communications with one or more parties utilizing hardware, software, and services as described herein. Communications component 306 may carry communications between components on computer device 300, as well as between computer device 300 and external devices, such as devices located across a communications network and/or devices serially or locally connected to computer device 300. For example, communications component 306 may include one or more buses, and may further include transmit chain components and receive chain components associated with a transmitter and receiver, respectively, operable for interfacing with external devices. Further, for example, with regard to AT 12, communications component 306 may include communications module 72 (FIG. 2).

Additionally, computer device 300 may further include a data store 308, which can be any suitable combination of memory, that provides for mass storage of information, databases, and programs employed in connection with aspects described herein. For example, data store 308 may be a data repository for applications not currently being executed by processor 302.

Computer device 300 may additionally include a user interface component 310 operable to receive inputs from a user of computer device 300, and further operable to generate outputs for presentation to the user. User interface component 310 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 310 may include one or more output devices, including but not limited to a display, a speaker, a haptic feedback mechanism, a printer, any other mechanism capable of presenting an output to a user, or any combination thereof.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features are described herein in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium or computer readable storage medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method of performing a handoff of a communication call, comprising:
   receiving notification, at a first base station operating on a licensed frequency, of a need to perform a handoff of a communication call of a wireless access terminal, wherein the communication call is on a first unlicensed frequency and is serviced by a second base station;
   obtaining a location of the wireless access terminal;
   identifying any base station operating in an unlicensed frequency spectrum and having a service area corresponding to the location of the wireless access terminal; and
   providing to the wireless access terminal identification information for a target base station for use in handing off the communication call based on the identifying.

2. The method of claim 1, wherein determining the identification information further comprises obtaining whitespace information, and correlating the location of the wireless access terminal with the whitespace information.

3. The method of claim 1, wherein the target base station comprises a third base station operating in the unlicensed frequency spectrum and having a service area corresponding to the location of the wireless access terminal, further comprising:
   establishing a tunnel from the second base station to the target base station via the first base station; and
   tunneling communications corresponding to the communication call from the second base station to the third base station via the tunnel.

4. The method of claim 1, wherein the providing comprises providing identification information corresponding to the first base station if no base station operating in an unlicensed frequency spectrum and having a service area corresponding to the location of the wireless access terminal is identified, and receiving a handoff of the communication call.

5. The method of claim 4, further comprising handing off the communication call from the first base station to an identified base station operating in an unlicensed frequency spectrum and having a service area corresponding to the location of the wireless access terminal.

6. The method of claim 1, wherein receiving the notification further comprises receiving based upon a determination made by the wireless access terminal or the second base station.

7. The method of claim 1, wherein the providing further comprises selecting identified base stations further based on service information corresponding to the identified base stations.

8. The method of claim 7, wherein the selecting further comprises selecting based on at least one of a communication link quality or a cost of service.

9. The method of claim 1, wherein the communication call on the first unlicensed frequency corresponds to a first sector of the second base station, wherein the second base station further comprises a second sector operating on a second unlicensed frequency different from the first unlicensed frequency, and further comprising obtaining AT-specific compatible or incompatible unlicensed frequency information, wherein the identifying further comprises identifying the second unlicensed frequency of the second sector if the second unlicensed frequency is compatible with the AT according to the AT-specific compatible or incompatible unlicensed frequency information.

10. The method of claim 1, wherein the communication call comprises a plurality of communication service types, and further comprising partitioning the plurality of communication service types for use between the first base station operating on the licensed frequency and a second base station operating on at least one available unlicensed frequency, wherein the providing of the target base station identifies the partitioning of the plurality of communication service types.

11. A non-transitory computer-readable medium storing computer-executable instructions, the computer-executable instructions comprising:
   at least one instruction operable to cause a computer to receive notification, at a first base station operating on a licensed frequency, of a need to perform a handoff of a communication call of a wireless access terminal, wherein the communication call is on a first unlicensed frequency and is serviced by a second base station;
   at least one instruction operable to cause the computer to obtain a location of the wireless access terminal;
   at least one instruction operable to cause the computer to identify any base station operating in an unlicensed frequency spectrum and having a service area corresponding to the location of the wireless access terminal; and
   at least one instruction operable to cause the computer to provide to the wireless access terminal identification information for a target base station for use in handing off the communication call based on the identifying.

12. An apparatus configured for performing a handoff of a communication call, comprising:
   means for receiving notification, at a first base station operating on a licensed frequency, of a need to perform a handoff of a communication call of a wireless access terminal, wherein the communication call is on a first unlicensed frequency and is serviced by a second base station;
   means for obtaining a location of the wireless access terminal;
   means for identifying any base station operating in an unlicensed frequency spectrum and having a service area corresponding to the location of the wireless access terminal; and
   means for providing to the wireless access terminal identification information for a target base station for use in handing off the communication call based on the identifying.

13. A base station, comprising:
   a receiver;
   a memory configured to store instructions; and
   at least a processor communicatively coupled with the receiver and the memory, wherein at least the processor is configured to execute the instructions to:
      receive notification, via the receiver at a first base station operating on a licensed frequency, of a need to perform a handoff of a communication call of a wireless access terminal, wherein the communication call is on a first unlicensed frequency and is serviced by a second base station;
      obtain a location of the wireless access terminal;
      identify any base station operating in an unlicensed frequency spectrum and having a service area corresponding to the location of the wireless access terminal; and
      provide to the wireless access terminal identification information for a target base station for use in handing off the communication call based on the identifying.

* * * * *